US012677259B2

(12) United States Patent
Wu

(10) Patent No.: US 12,677,259 B2
(45) Date of Patent: Jul. 7, 2026

(54) METHOD AND DEVICE IN NODES USED FOR WIRELESS COMMUNICATION

(71) Applicant: Lu Wu, Shanghai (CN)

(72) Inventor: Lu Wu, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 377 days.

(21) Appl. No.: 18/404,918

(22) Filed: Jan. 5, 2024

(65) Prior Publication Data

US 2024/0137914 A1 Apr. 25, 2024
US 2024/0236955 A9 Jul. 11, 2024

Related U.S. Application Data

(63) Continuation of application No. PCT/CN2022/100937, filed on Jun. 24, 2022.

(30) Foreign Application Priority Data

Jul. 9, 2021 (CN) .......................... 202110779276.4
Jul. 16, 2021 (CN) .......................... 202110803783.7

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0051* (2013.01); *H04W 16/28* (2013.01); *H04W 72/0453* (2013.01)

(58) Field of Classification Search
None
See application file for complete search history.

(56) References Cited

U.S. PATENT DOCUMENTS

2021/0014095 A1 1/2021 Ly et al.
2021/0099329 A1 4/2021 Hellfajer et al.
(Continued)

FOREIGN PATENT DOCUMENTS

CN 110178331 A 8/2019
CN 111385863 A 7/2020

OTHER PUBLICATIONS

ISR received in application No. PCT/CN2022/100937 dated Aug. 29, 2022.

*Primary Examiner* — Hong S Cho

(57) ABSTRACT

A first node receives a first signaling; and transmits a first signal and a second signal respectively in a first time-domain resource block and a second time-domain resource block. The first time-domain resource block and the second time-domain resource block both belong to a reference time window; the first node maintains power consistency and phase continuity between multiple first-type signals that belong to a same first-type time window in time domain; whether a first condition set is satisfied is used to determine a number of first-type time window(s) comprised by the reference time window; the first condition set comprises a first condition, the first condition comprising that the first node transmits a third signal in a third time-domain resource block and the third time-domain resource block is overlapped with only one of the first time-domain resource block or the second time-domain resource block.

20 Claims, 6 Drawing Sheets

(51) Int. Cl.
     *H04W 16/28*      (2009.01)
     *H04W 72/0453*    (2023.01)

(56)                    References Cited

U.S. PATENT DOCUMENTS

2021/0135820 A1 *   5/2021   Liu ........................ H04L 5/0094
2023/0179348 A1 *   6/2023   Seok .................... H04L 5/0012
                                                   370/280

* cited by examiner

100

First node receiving first signaling —101 transmitting first signal and second —102
signal respectively in first time-
domain resource block and second
time-domain resource block

5GS/EPS 200

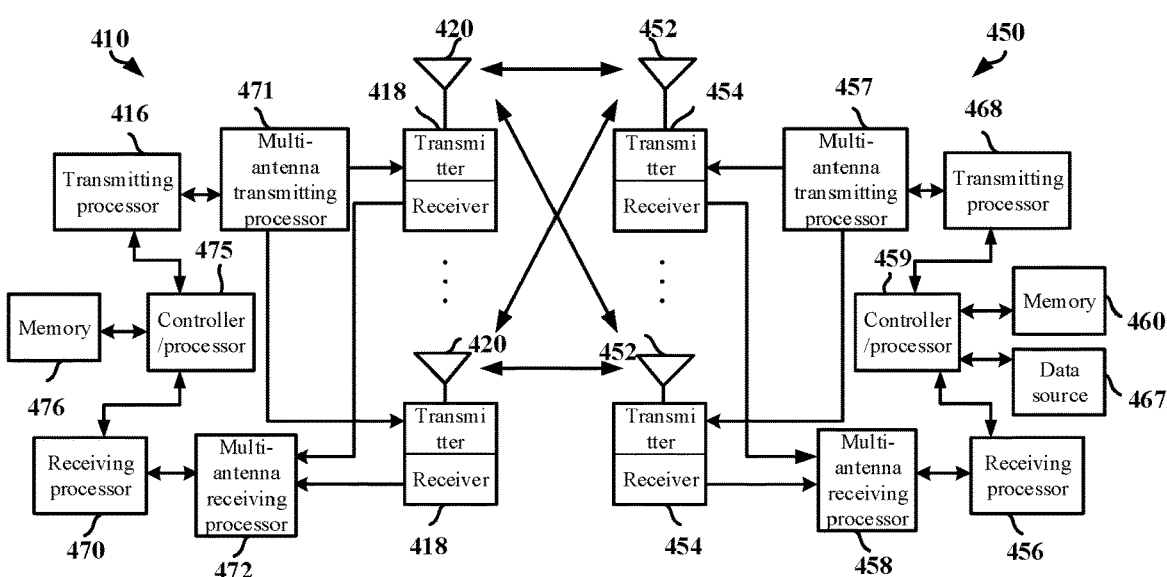

FIG. 4

```
┌──────────────────┐                      ┌─────────────────┐
│ Second node N02  │                      │ First node U01  │
└────────┬─────────┘                      └────────┬────────┘
         │                                         │
 ┌───────┴─────────────────────────┐               │
 │ S5201.transmitting first signaling│             │
 └───────┬─────────────────────────┘               │
         │────────First signaling───────────────►  │
         │                          ┌───────────────┴──────────────┐
         │                          │ S5101.receiving first signaling│
         │                          └───────────────┬──────────────┘
         │          ┌───────────────────────────────┴──────────────┐
         │          │ S5102.transmitting first signal and          │
         │          │ second signal respectively in first          │
         │          │ time-domain resource block and               │
         │          │ second time-domain resource block            │
         │          └───────────────────────────────┬──────────────┘
         │◄─────first signal and second signal───────│
 ┌───────┴─────────────────────────────┐            │
 │ S5202.receiving first signal and     │           │
 │ second signal respectively in first  │           │
 │ time-domain resource block and       │           │
 │ second time-domain resource block    │           │
 └───────┬─────────────────────────────┘            │
```

S5103.transmitting first demodulation reference signal (DMRS) and second demodulation reference signal (DMRS) respectively in first time-domain resource block and second time-domain resource block first DMRS and second DMRS S5103.receiving first demodulation reference signal (DMRS) and second demodulation reference signal (DMRS) respectively in first time-domain resource block and second time-domain resource block F1. optional End     End

FIG. 5

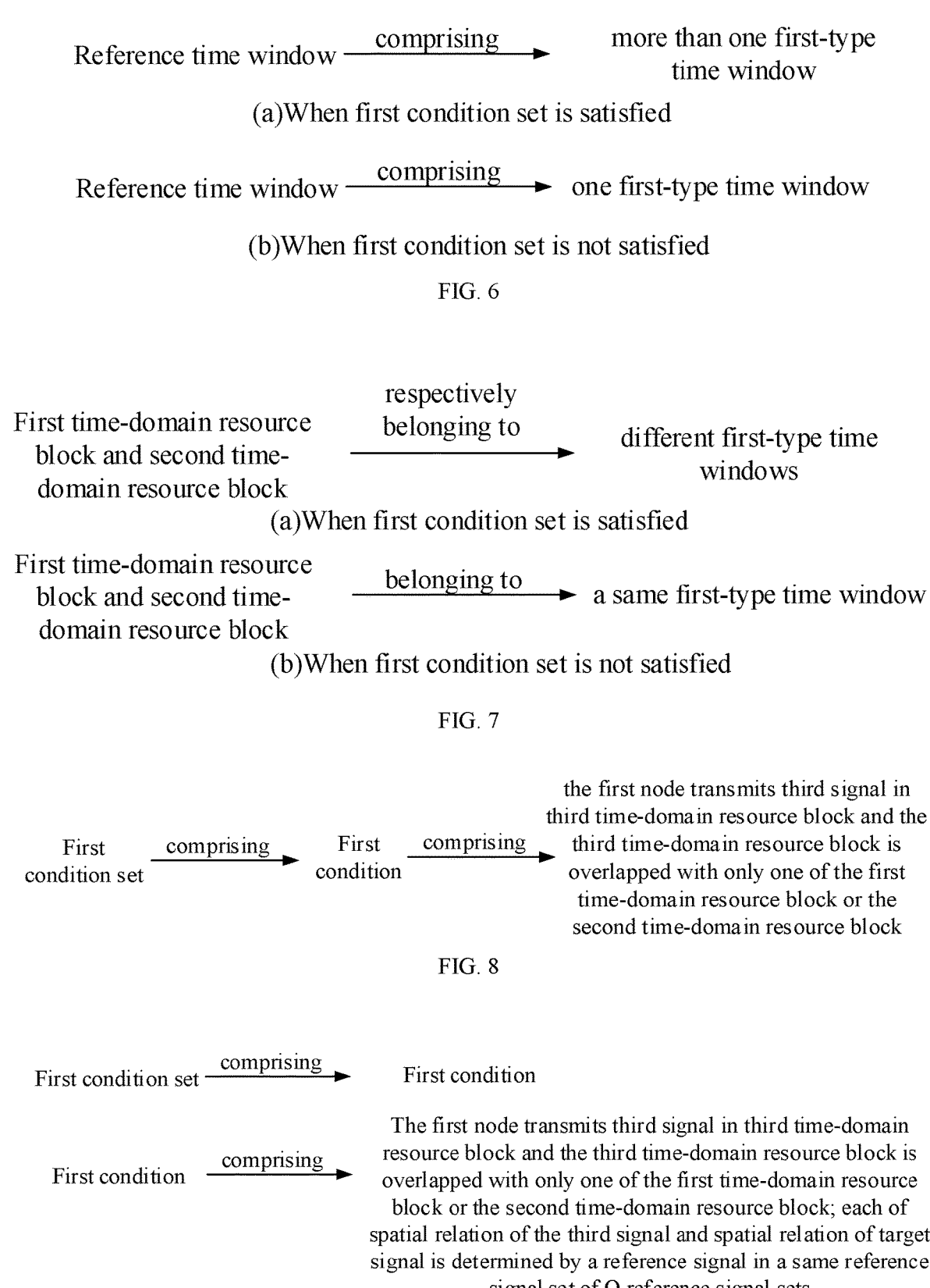

Reference time window ——comprising——► more than one first-type time window (a)When first condition set is satisfied Reference time window ——comprising——► one first-type time window (b)When first condition set is not satisfied

FIG. 6

First time-domain resource block and second time-domain resource block ——respectively belonging to——► different first-type time windows (a)When first condition set is satisfied First time-domain resource block and second time-domain resource block ——belonging to——► a same first-type time window (b)When first condition set is not satisfied

FIG. 7

First condition set ——comprising——► First condition ——comprising——► the first node transmits third signal in third time-domain resource block and the third time-domain resource block is overlapped with only one of the first time-domain resource block or the second time-domain resource block

FIG. 8

First condition set ——comprising——► First condition

First condition ——comprising——► The first node transmits third signal in third time-domain resource block and the third time-domain resource block is overlapped with only one of the first time-domain resource block or the second time-domain resource block; each of spatial relation of the third signal and spatial relation of target signal is determined by a reference signal in a same reference signal set of Q reference signal sets

FIG. 9

First condition set comprises more than one condition, first condition is a condition in the first condition set, and second condition is a condition in the first condition set

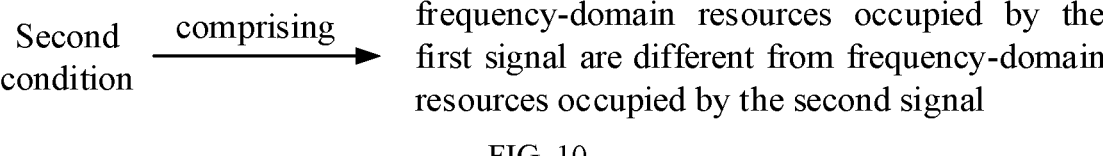

FIG. 10

First condition set comprises more than one condition, first condition is a condition in the first condition set, and third condition is a condition in the first condition set

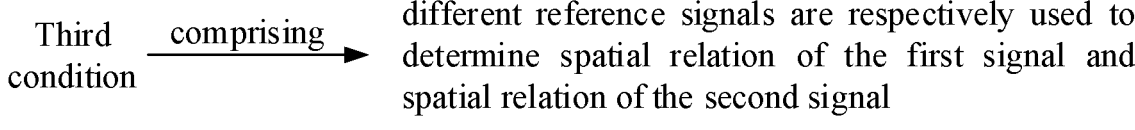

FIG. 11

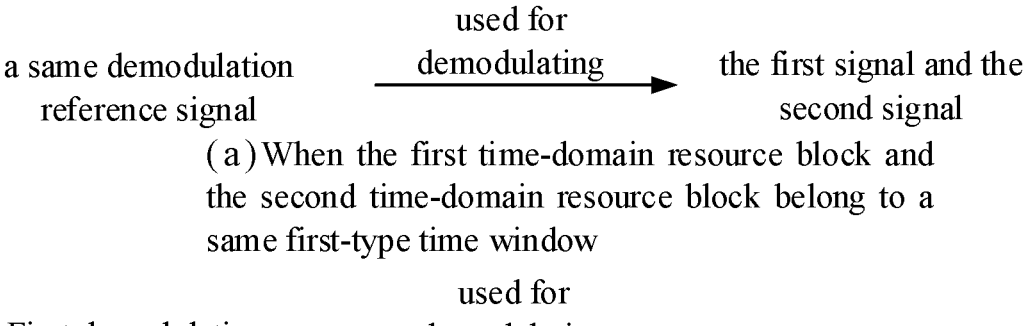

(a) When the first time-domain resource block and the second time-domain resource block belong to a same first-type time window First signal Second signal (b) When the first time-domain resource block and the second time-domain resource block respectively belong to different first-type time windows

FIG. 12

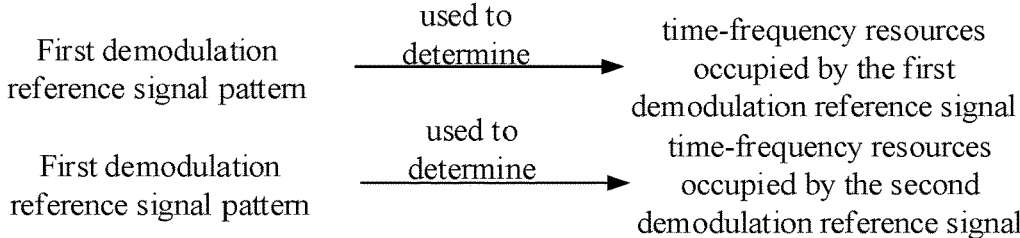

First demodulation reference signal pattern — used to determine → time-frequency resources occupied by the first demodulation reference signal First demodulation reference signal pattern — used to determine → time-frequency resources occupied by the second demodulation reference signal (a)When the first time-domain resource block and the second time-domain resource block belong to a same first-type time window

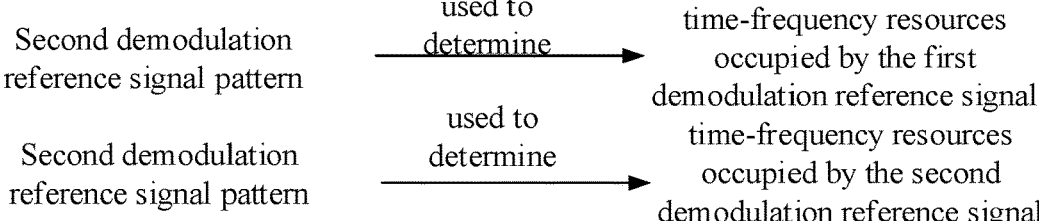

Second demodulation reference signal pattern — used to determine → time-frequency resources occupied by the first demodulation reference signal Second demodulation reference signal pattern — used to determine → time-frequency resources occupied by the second demodulation reference signal (b)When the first time-domain resource block and the second time-domain resource block respectively belong to different first-type time windows

FIG. 13

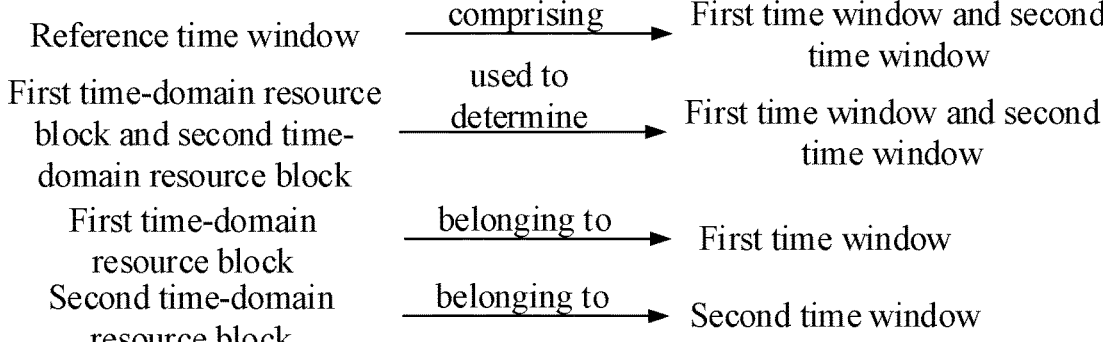

Reference time window — comprising → First time window and second time window

First time-domain resource block and second time-domain resource block — used to determine → First time window and second time window First time-domain resource block — belonging to → First time window Second time-domain resource block — belonging to → Second time window When first condition set is satisfied

FIG. 14

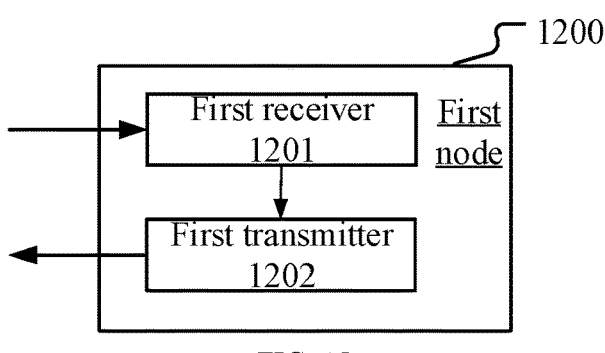

1200

First receiver 1201        First node

First transmitter 1202

FIG. 15

METHOD AND DEVICE IN NODES USED FOR WIRELESS COMMUNICATION

CROSS REFERENCE TO RELATED APPLICATIONS

This application is the continuation of the international patent application No. PCT/CN2022/100937, filed on Jun. 24, 2022, and claims the priority benefit of Chinese Patent Application No. 202110803783.7, filed on Jul. 16, 2021, and claims the priority benefit of Chinese Patent Application No. 202110779276.4, filed on Jul. 9, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

RELATED ART

In a 5G system, for the enhancement of coverage, a Work Item (WI) about coverage enhancement in New Radio (NR) Release 17 was approved at the 3rd Generation Partner Project (3GPP) Radio Access Network (RAN) #90e Plenary. How to achieve enhancements on the coverage of Physical Uplink Shared CHannel (PUSCH) transmission is one focus of studies in the WI.

SUMMARY

Inventors find through researches that how to determine whether powers of multiple transmissions are consistent and whether phases of the multiple transmissions are continuous is a key issue.

To address the above problem, the present application provides a solution. It should be noted that although only the uplink (UL) is taken as an example in the description above, the present application is also applicable to other scenarios such as Downlink (DL) and Sidelink (SL), where similar technical effects can be achieved. Additionally, the adoption of a unified solution for various scenarios, including but not limited to UL, DL and SL, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling; and transmitting a first signal and a second signal respectively in a first time-domain resource block and a second time-domain resource block;

herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, a problem to be solved in the present application includes: how to determine whether there exist power consistency and phase continuity among multiple transmissions.

In one subembodiment, the transmission is an uplink transmission.

In one subembodiment, the transmission is a downlink transmission.

In one subembodiment, the transmission is a sidelink transmission.

In one subembodiment, the transmission bears identical data.

In one subembodiment, the transmission bears different data.

In one subembodiment, the transmission bears identical control information.

In one subembodiment, the transmission bears different control information.

In one subembodiment, the transmission bears identical bit blocks.

In one subembodiment, the transmission bears different bit blocks.

In one embodiment, a problem to be solved in the present application includes: how to determine a time window in which power consistency and phase continuity between multiple transmissions are maintained.

In one subembodiment, the transmission is an uplink transmission.

In one subembodiment, the transmission is a downlink transmission.

In one subembodiment, the transmission is a sidelink transmission.

In one subembodiment, the transmission bears identical data.

In one subembodiment, the transmission bears different data.

In one subembodiment, the transmission bears identical control information.

In one subembodiment, the transmission bears different control information.

In one subembodiment, the transmission bears identical bit blocks.

In one subembodiment, the transmission bears different bit blocks.

In one embodiment, a problem to be solved in the present application includes: how to determine whether there exist power consistency and phase continuity among multiple PUSCH repetitions.

In one embodiment, a problem to be solved in the present application includes: how to determine whether there exist power consistency and phase continuity among multiple Physical Uplink Control CHannels (PUCCHs).

In one embodiment, the essence of the above method lies in that: a first signal and a second signal are respectively two transmissions, and a first-type time window is a time window in which power consistency and phase continuity are maintained between multiple transmissions, and these two transmissions belong to a reference time window, and a number of first-type time window(s) comprised by the reference time window is determined according to whether a first condition set is satisfied; a third signal is a signal frequency division or spatial division multiplexed with a first signal or a second signal.

In one embodiment, the essence of the above method lies in that: a first signal and a second signal are respectively two PUSCH repetitions, and a first-type time window is a time window in which power consistency and phase continuity are maintained between multiple PUSCH repetitions, and these two PUSCH repetitions belong to a reference time window, and a number of first-type time window(s) comprised by the reference time window is determined according to whether a first condition set is satisfied; a third signal is a signal frequency division or spatial division multiplexed with a first signal or a second signal.

In one embodiment, the above method is advantageous in clarifying conditions for determining a time window in which power consistency and phase continuity are maintained between multiple transmissions, which ensures the consistency between receiving and transmitting ends.

In one embodiment, the above method is advantageous in enhancing the precision of channel estimation and thus enhancing the reliability of transmission, with power consistency and phase continuity being maintained among multiple transmissions.

According to one aspect of the present application, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

In one embodiment, the essence of the above method lies in that Q reference signal sets are respectively transmitted or received by Q antenna panels.

In one embodiment, the essence of the above method lies in that Q reference signal sets are respectively transmitted or received by Q groups of antennas.

In one embodiment, the essence of the above method lies in that Q reference signal sets are respectively transmitted by Q power amplifiers.

In one embodiment, the essence of the above method lies in that Q reference signal sets are respectively transmitted or received by Q groups of antennas, the Q groups of antennas respectively corresponding to Q power amplifiers.

In one embodiment, the essence of the above method lies in that: a third signal shares a same power amplifier with a first signal or a second signal.

According to one aspect of the present application, characterized in that the first condition set comprises more than one condition, and the first condition is a condition in the first condition set; when there is one condition in the first condition set being satisfied, the first condition set is satisfied; the first condition set also comprises a second condition, the second condition being a condition in the first condition set; the second condition comprises that frequency-domain resources occupied by the first signal are different from frequency-domain resources occupied by the second signal.

According to one aspect of the present application, characterized in that the first condition set comprises more than one condition, and the first condition is a condition in the first condition set; when there is one condition in the first condition set being satisfied, the first condition set is satisfied; the first condition set also comprises a third condition, the third condition being a condition in the first condition set; the third condition comprises that different reference signals are respectively used to determine a spatial relation of the first signal and a spatial relation of the second signal.

According to one aspect of the present application, characterized in that the first transmitter also transmits a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

In one embodiment, the essence of the above method lies in that: multiple transmissions among which power consistency and phase continuity are maintained can share identical demodulation reference signals.

In one embodiment, the essence of the above method lies in that: combined channel estimation can be made on multiple transmissions among which power consistency and phase continuity are maintained.

In one embodiment, the above method is advantageous in enhancing the reliability of multiple transmissions among which power consistency and phase continuity are maintained.

According to one aspect of the present application, characterized in that time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

According to one aspect of the present application, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

The present application provides a method in a second node for wireless communications, comprising: transmitting a first signaling; and receiving a first signal and a second signal respectively in a first time-domain resource block and a second time-domain resource block; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

According to one aspect of the present application, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

According to one aspect of the present application, characterized in that the first condition set comprises more than one condition, and the first condition is a condition in the first condition set; when there is one condition in the first condition set being satisfied, the first condition set is satisfied; the first condition set also comprises a second condition, the second condition being a condition in the first condition set; the second condition comprises that frequency-domain resources occupied by the first signal are different from frequency-domain resources occupied by the second signal.

According to one aspect of the present application, characterized in that the first condition set comprises more than one condition, and the first condition is a condition in the first condition set; when there is one condition in the first condition set being satisfied, the first condition set is satisfied; the first condition set also comprises a third condition, the third condition being a condition in the first condition set; the third condition comprises that different reference signals are respectively used to determine a spatial relation of the first signal and a spatial relation of the second signal.

According to one aspect of the present application, characterized in comprising: receiving a first demodulation reference signal and a second demodulation reference signal respectively in the first time-domain resource block and the second time-domain resource block; herein, when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

According to one aspect of the present application, characterized in that time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

According to one aspect of the present application, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

The present application provides a first node for wireless communications, comprising:

a first receiver, receiving a first signaling; and a first transmitter, transmitting a first signal and a second signal respectively in a first time-domain resource block and a second time-domain resource block;

herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

The present application provides a second node for wireless communications, comprising:

a second transmitter, transmitting a first signaling; and a second receiver, receiving a first signal and a second signal respectively in a first time-domain resource block and a second time-domain resource block;

herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

In one embodiment, compared with the prior art, the present application is advantageous in the following aspects:

making clear the conditions for determining a time window in which consistent power and continuous phases are maintained between multiple transmissions;

ensuring the consistency between receiving and transmitting ends;

enhancing the precision of channel estimation and thus enhancing the reliability of transmission, with power consistency and phase continuity being maintained among multiple transmissions;

multiple transmissions among which power consistency and phase continuity are maintained can share identical demodulation reference signals;

combined channel estimation can be made on multiple transmissions among which power consistency and phase continuity are maintained;

enhancing the reliability of multiple transmissions among which power consistency and phase continuity are maintained.

BRIEF DESCRIPTION OF THE DRAWINGS

Other features, objects and advantages of the present application will become more apparent from the detailed description of non-restrictive embodiments taken in conjunction with the following drawings:

FIG. 4 illustrates a schematic diagram of a first communication device and a second communication device according to one embodiment of the present application.

FIG. 5 illustrates a flowchart of transmission according to one embodiment of the present application.

FIG. 6 illustrates a schematic diagram of a relation between a first condition set and a first-type time window according to one embodiment of the present application.

FIG. 7 illustrates a schematic diagram of a relation between a first condition set and a first-type time window according to another embodiment of the present application.

FIG. 8 illustrates a schematic diagram of a first condition set according to one embodiment of the present application.

FIG. 9 illustrates a schematic diagram of a first condition set according to another embodiment of the present application.

FIG. 10 illustrates a schematic diagram of a first condition set according to a third embodiment of the present application.

FIG. 11 illustrates a schematic diagram of a first condition set according to a fourth embodiment of the present application.

FIG. 12 illustrates a schematic diagram of a demodulation reference signal for demodulating the first signal and a demodulation reference signal for demodulating the second signal according to one embodiment of the present application.

FIG. 13 illustrates a schematic diagram of time-frequency resources occupied by a first demodulation reference signal and time-frequency resources occupied by a second demodulation reference signal according to one embodiment of the present application.

FIG. 14 illustrates a schematic diagram of time-frequency resources occupied by a first demodulation reference signal and time-frequency resources occupied by a second demodulation reference signal according to another embodiment of the present application.

FIG. 15 illustrates a structure block diagram of a processing device used in a first node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
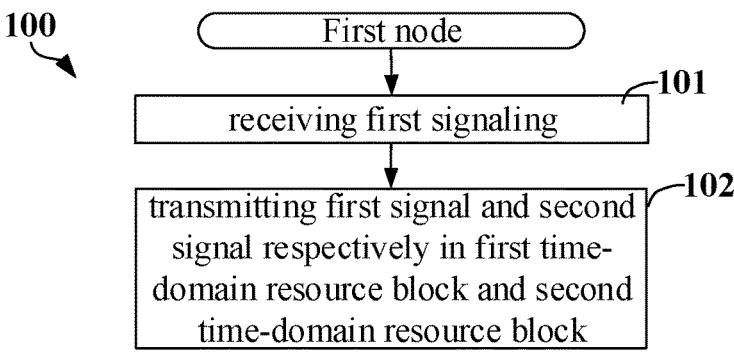
FIG. 1 illustrates a flowchart of a first signaling, a first signal and a second signal according to one embodiment of the present application.

Embodiment 1 illustrates a flowchart of a first signaling, a first signal and a second signal according to one embodiment of the present application, as shown in FIG. 1. In 100 illustrated by FIG. 1, each box represents a step.

In Embodiment 1, the first node in the present application receives a first signaling in step 101; transmits a first signal and a second signal respectively in a first time-domain resource block and a second time-domain resource block in step 102; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, the first signaling is a higher-layer signaling.

In one embodiment, the first signaling is an RRC signaling.

In one embodiment, the first signaling is a physical layer signaling.

In one embodiment, the first signaling is a Downlink Control Information (DCI) signaling.

In one embodiment, the first signaling is an uplink DCI signaling.

In one embodiment, the first signaling is a DCI signaling that schedules a Physical Uplink Shared CHannel (PUSCH).

In one embodiment, the first signaling is a DCI signaling that triggers a Configured Grant PUSCH.

In one embodiment, the first signaling indicates a Configured Grant PUSCH.

In one embodiment, the first signaling is a DCI signaling that schedules a PUSCH repetition.

In one embodiment, the first signaling is a DCI signaling that triggers a Configured Grant PUSCH repetition.

In one embodiment, the first signaling indicates a Configured Grant PUSCH repetition.

In one embodiment, the first time-domain resource block comprises at least one symbol, and the second time-domain resource block comprises at least one symbol.

In one embodiment, the first time-domain resource block comprises one symbol or multiple consecutive symbols, and the second time-domain resource block comprises one symbol or multiple consecutive symbols.

In one embodiment, the first time-domain resource block and the second time-domain resource block are respectively two time-domain resource blocks among N orthogonal time-domain resource blocks; N is a positive integer greater than 1.

In one embodiment, the first time-domain resource block and the second time-domain resource block are respectively two adjacent time-domain resource blocks among the N orthogonal time-domain resource blocks.

In one embodiment, the first time-domain resource block and the second time-domain resource block are respectively two earliest time-domain resource blocks among the N orthogonal time-domain resource blocks.

In one embodiment, the first time-domain resource block and the second time-domain resource block are respectively two latest time-domain resource blocks among the N orthogonal time-domain resource blocks.

In one embodiment, the first time-domain resource block and the second time-domain resource block are respectively any two time-domain resource blocks among the N orthogonal time-domain resource blocks.

In one embodiment, any time-domain resource block among the N orthogonal time-domain resource blocks comprises at least one symbol.

In one embodiment, any time-domain resource block among the N orthogonal time-domain resource blocks comprises one symbol or multiple consecutive symbols.

In one embodiment, N is equal to 2, and the sentence that "the first time-domain resource block and the second time-domain resource block are respectively two time-domain resource blocks among N orthogonal time-domain resource blocks" means that the N orthogonal time-domain resource blocks consist of the first time-domain resource block and the second time-domain resource block.

In one embodiment, N is greater than 2.

In one embodiment, the first signaling also indicates N.

In one embodiment, a higher layer parameter indicates N.

In one embodiment, an RRC parameter indicates N.

In one embodiment, the symbol is a single-carrier symbol.

In one embodiment, the symbol is a multi-carrier symbol.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the meaning of the sentence "the first time-domain resource block and the second time-domain resource block being orthogonal" includes: the first time-domain resource block and the second time-domain resource block are non-overlapped.

In one embodiment, the meaning of the sentence "the first time-domain resource block and the second time-domain resource block being orthogonal" includes: the first time-domain resource block and the second time-domain resource block do not comprise any one identical symbol.

In one embodiment, the meaning of the sentence "the first time-domain resource block and the second time-domain resource block being orthogonal" includes: any symbol in the first time-domain resource block does not belong to the second time-domain resource block.

In one embodiment, the phrase "N orthogonal time-domain resource blocks" means that: any two time-domain resource blocks among the N orthogonal time-domain resource blocks do not comprise any one identical symbol.

In one embodiment, the phrase "N orthogonal time-domain resource blocks" means that: any two time-domain resource blocks among the N orthogonal time-domain resource blocks are orthogonal.

In one embodiment, the reference time window comprises multiple consecutive symbols.

In one embodiment, the reference time window comprises a contiguous period of time.

In one embodiment, the reference time window only comprises the first time-domain resource block and the second time-domain resource block.

In one embodiment, the reference time window also comprises time-domain resources other than the first time-domain resource block and the second time-domain resource block.

In one embodiment, the reference time window also comprises symbols other than the first time-domain resource block and the second time-domain resource block.

In one embodiment, the reference time window comprises the N orthogonal time-domain resource blocks.

In one embodiment, the reference time window comprises partial time-domain resource blocks among the N orthogonal time-domain resource blocks.

In one embodiment, the reference time window comprises partial or all time-domain resource blocks among the N orthogonal time-domain resource blocks.

In one embodiment, the reference time window comprises the earliest N1 time-domain resource block(s) among the N orthogonal time-domain resource blocks, N1 being a positive integer no greater than N.

In one embodiment, the reference time window comprises only the first time-domain resource block and the second time-domain resource block among the N orthogonal time-domain resource blocks.

In one embodiment, the reference time window comprises only the first time-domain resource block and the second time-domain resource block among the N orthogonal time-domain resource blocks, the first time-domain resource block and the second time-domain resource block being two adjacent time-domain resource blocks among the N orthogonal time-domain resource blocks.

In one embodiment, the reference time window comprises at least the first time-domain resource block and the second time-domain resource block among the N orthogonal time-domain resource blocks.

In one embodiment, the reference time window comprises at least the first time-domain resource block and the second time-domain resource block among the N orthogonal time-domain resource blocks and a duration of the reference time window is no greater than a first threshold.

In one embodiment, the reference time window comprises at least the first time-domain resource block and the second time-domain resource block among the N orthogonal time-domain resource blocks and a number of symbols comprised by the reference time window is no greater than a first threshold.

In one embodiment, the reference time window comprises at least the first time-domain resource block and the second time-domain resource block among the N orthogonal time-domain resource blocks and a number of repetitions comprised by the reference time window is no greater than a first threshold.

In one embodiment, the reference time window only comprises the N orthogonal time-domain resource blocks.

In one embodiment, the reference time window also comprises time-domain resources other than the N orthogonal time-domain resource blocks.

In one embodiment, the reference time window comprises multiple consecutive symbols, a starting symbol of the reference time window is a starting symbol of the N orthogonal time-domain resource blocks, and an ending symbol of the reference time window is an ending symbol of the N orthogonal time-domain resource blocks.

In one embodiment, the reference time window comprises multiple consecutive symbols, a starting symbol of the reference time window is a starting symbol of an earlier time-domain resource block of the first time-domain resource block and the second time-domain resource block, and an ending symbol of the reference time window is an ending symbol of a later time-domain resource block of the first time-domain resource block and the second time-domain resource block.

In one embodiment, the reference time window is configured by a higher layer signaling.

In one embodiment, the reference time window is configured by an RRC signaling.

In one embodiment, a duration of the reference time window is indicated by a higher layer parameter.

In one embodiment, a number of symbols comprised by the reference time window is indicated by a higher layer parameter.

In one embodiment, a number of repetitions comprised by the reference time window is indicated by a higher layer parameter.

In one embodiment, a duration of the reference time window is no greater than a first threshold.

In one embodiment, a number of symbols comprised by the reference time window is no greater than a first threshold.

In one embodiment, a number of repetitions comprised by the reference time window is no greater than a first threshold.

In one embodiment, the number of repetitions comprised by the reference time window refers to a total number of first bit block repetitions in the reference time window.

In one embodiment, the number of repetitions comprised by the reference time window refers to a total number of first-type signal repetitions in the reference time window.

In one embodiment, the reference time window comprises at least one first-type time window.

In one embodiment, the first threshold is configured by a higher layer parameter.

In one embodiment, the first threshold is reported to the second node by the first node.

In one embodiment, the first threshold is reported to the transmitter of the first signaling by the first node.

In one embodiment, the first threshold is measured in milliseconds (ms).

In one embodiment, the first threshold is measurement in symbols.

In one embodiment, the first threshold is a repetition number.

In one embodiment, the first threshold is a positive integer.

In one embodiment, the first threshold is a positive real number.

In one embodiment, the meaning of the sentence that "the first signaling is used for indicating the first time-domain resource block and the second time-domain resource block" includes: the first signaling indicates at least one of the first time-domain resource block or the second time-domain resource block.

In one embodiment, the meaning of the sentence that "the first signaling is used for indicating the first time-domain resource block and the second time-domain resource block" includes: the first signaling indicates only one of the first time-domain resource block or the second time-domain resource block.

In one embodiment, the meaning of the sentence that "the first signaling is used for indicating the first time-domain resource block and the second time-domain resource block" includes: the first signaling indicates an earlier time-domain resource block of the first time-domain resource block and the second time-domain resource block.

In one subembodiment, the first time-domain resource block is earlier than the second time-domain resource block; the first signaling indicates the first time-domain resource block, the second time-domain resource block is later than the first time-domain resource block and a number of symbols comprised by the second time-domain resource block is equal to a number of symbols comprised by the first time-domain resource block.

In one subembodiment, the second time-domain resource block is earlier than the first time-domain resource block; the first signaling indicates the second time-domain resource block, the first time-domain resource block is later than the second time-domain resource block and a number of symbols comprised by the first time-domain resource block is equal to a number of symbols comprised by the second time-domain resource block.

In one embodiment, the meaning of the sentence that "the first signaling is used for indicating the first time-domain resource block and the second time-domain resource block" includes: the first signaling indicates an earliest time-domain resource block among the N orthogonal time-domain resource blocks, the first time-domain resource block and the second time-domain resource block being two time-domain resource blocks among the N orthogonal time-domain resource blocks; N is a positive integer greater than 1.

In one embodiment, the meaning of the sentence that "the first signaling is used for indicating the first time-domain resource block and the second time-domain resource block" includes: the first signaling comprises a first field, and the first field in the first signaling is used for indicating the first time-domain resource block and the second time-domain resource block.

In one embodiment, the meaning of the sentence that "the first field in the first signaling is used for indicating the first time-domain resource block and the second time-domain resource block" includes: the first field in the first signaling indicates at least one of the first time-domain resource block or the second time-domain resource block.

In one embodiment, the meaning of the sentence that "the first field in the first signaling is used for indicating the first time-domain resource block and the second time-domain resource block" includes: the first field in the first signaling indicates only one of the first time-domain resource block or the second time-domain resource block.

In one embodiment, the meaning of the sentence that "the first field in the first signaling is used for indicating the first time-domain resource block and the second time-domain resource block" includes: the first field in the first signaling indicates an earlier time-domain resource block of the first time-domain resource block and the second time-domain resource block.

In one subembodiment, the first time-domain resource block is earlier than the second time-domain resource block; the first field in the first signaling indicates the first time-domain resource block, the second time-domain resource block is later than the first time-domain resource block and a number of symbols comprised by the second time-domain resource block is equal to a number of symbols comprised by the first time-domain resource block.

In one subembodiment, the second time-domain resource block is earlier than the first time-domain resource block; the first field in the first signaling indicates the second time-domain resource block, the first time-domain resource block is later than the second time-domain resource block and a number of symbols comprised by the first time-domain resource block is equal to a number of symbols comprised by the second time-domain resource block.

In one embodiment, the meaning of the sentence that "the first field in the first signaling is used for indicating the first time-domain resource block and the second time-domain resource block" includes: the first field in the first signaling indicates an earliest time-domain resource block among the N orthogonal time-domain resource blocks, the first time-domain resource block and the second time-domain resource block being two time-domain resource blocks among the N orthogonal time-domain resource blocks; N is a positive integer greater than 1.

In one embodiment, the first field comprises at least one bit.

In one embodiment, a number of bit(s) comprised by the first field is configured by a higher layer parameter.

In one embodiment, the first field is a Time domain resource assignment field.

In one embodiment, for the specific definition of the Time domain resource assignment field, refer to 3GPP TS 38.212, Section 7.3.1.

In one embodiment, the meaning of the sentence that "the first signaling is used for indicating the first time-domain resource block and the second time-domain resource block" includes: the first signaling is used for indicating the reference time window, the first time-domain resource block and the second time-domain resource block both belonging to the reference time window.

In one embodiment, the meaning of the sentence that "the first signaling is used for indicating the reference time window" includes: the first signaling explicitly indicates the reference time window.

In one embodiment, the meaning of the sentence that "the first signaling is used for indicating the reference time window" includes: the first signaling implicitly indicates the reference time window.

In one embodiment, the meaning of the sentence that "the first signaling is used for indicating the reference time window" includes: the first signaling indicates a start time of the reference time window.

In one embodiment, the meaning of the sentence that "the first signaling is used for indicating the reference time window" includes: the first signaling indicates a starting symbol of the reference time window.

In one embodiment, the meaning of the sentence that "the first signaling is used for indicating the reference time window" includes: the first signaling indicates a start time of the reference time window, and a duration of the reference time window is indicated by a higher layer parameter.

In one embodiment, the meaning of the sentence that "the first signaling is used for indicating the reference time window" includes: the first signaling indicates a starting symbol of the reference time window, and a number of symbols comprised by the reference time window is indicated by a higher layer parameter.

In one embodiment, the meaning of the sentence that "the first signaling is used for indicating the reference time window" includes: the first signaling indicates a starting symbol of the reference time window, and a duration of the reference time window is indicated by a higher layer parameter.

In one embodiment, the meaning of the sentence that "the first signaling is used for indicating the reference time window" includes: the first signaling indicates a start time of the reference time window and a duration of the reference time window.

In one embodiment, the meaning of the sentence that "the first signaling is used for indicating the reference time window" includes: the first signaling indicates a starting symbol of the reference time window and a number of symbols comprised by the reference time window.

In one embodiment, the meaning of the sentence that "the first signaling is used for indicating the reference time window" includes: the first signaling indicates a start time of the reference time window and an end time of the reference time window.

In one embodiment, the meaning of the sentence that "the first signaling is used for indicating the reference time window" includes: the first signaling indicates a starting symbol of the reference time window and an ending symbol of the reference time window.

In one embodiment, the meaning of the sentence that "the first signaling indicates a start time of the reference time window" includes: the first signaling comprises a second field, and the second field in the first signaling indicates a start time of the reference time window, the second field being different from the first field.

In one embodiment, the meaning of the sentence that "the first signaling indicates a start time of the reference time window" includes: the first field in the first signaling indicates a start time of the reference time window.

In one embodiment, the meaning of the sentence that "the first signaling indicates a start time of the reference time window" includes: the first field in the first signaling indicates a start time of the N orthogonal time-domain resource blocks, where a start time of the reference time window is the start time of the N orthogonal time-domain resource blocks.

In one embodiment, the meaning of the sentence that "the first signaling indicates a start time of the reference time window" includes: the first field in the first signaling is used for indicating the first time-domain resource block and the second time-domain resource block, where a start time of the reference time window is a start time of the earlier time-domain resource block of the first time-domain resource block and the second time-domain resource block.

In one embodiment, the meaning of the sentence that "the first signaling indicates a starting symbol of the reference time window" includes: the first signaling comprises a second field, and the second field in the first signaling indicates a starting symbol of the reference time window, the second field being different from the first field. In one embodiment, the meaning of the sentence that "the first signaling indicates a starting symbol of the reference time window" includes: the first field in the first signaling indicates a starting symbol of the reference time window.

In one embodiment, the meaning of the sentence that "the first signaling indicates a starting symbol of the reference time window" includes: the first field in the first signaling indicates a starting symbol of the N orthogonal time-domain resource blocks, where a starting symbol of the reference time window is the starting symbol of the N orthogonal time-domain resource blocks.

In one embodiment, the meaning of the sentence that "the first signaling indicates a starting symbol of the reference time window" includes: the first field in the first signaling is used for indicating the first time-domain resource block and the second time-domain resource block, where a starting symbol of the reference time window is a starting symbol of the earlier time-domain resource block of the first time-domain resource block and the second time-domain resource block.

In one embodiment, the first-type signal comprises a bit block transmission.

In one embodiment, the first-type signal comprises a bit block repetition.

In one embodiment, the first-type signal comprises an uplink transmission.

In one embodiment, the first-type signal comprises a PUSCH transmission.

In one embodiment, the first-type signal comprises a PUCCH transmission.

In one embodiment, the first signal and the second signal respectively comprise two uplink transmissions, and each of the first-type signals comprises an uplink transmission.

In one embodiment, the first signal and the second signal respectively comprise two PUSCH transmissions, and each of the first-type signals comprises a PUSCH transmission.

In one embodiment, the first signal and the second signal respectively comprise two Physical Uplink Control CHannel (PUCCH) transmissions, and each of the first-type signals comprises a PUCCH transmission.

In one embodiment, each of the first signal and the second signal comprises a first bit block repetition.

In one embodiment, the first signal and the second signal respectively comprise two first bit block repetitions.

In one embodiment, the phrase "a bit block repetition" refers to an actual repetition of a bit block.

In one embodiment, the phrase "a bit block repetition" refers to a nominal repetition of a bit block.

In one embodiment, the phrase "first bit block repetition" refers to an actual repetition of a first bit block.

In one embodiment, the phrase "first bit block repetition" refers to a nominal repetition of a first bit block.

In one embodiment, the phrase "first-type signal repetition" refers to an actual repetition of a first-type signal.

In one embodiment, the phrase "first-type signal repetition" refers to a nominal repetition of a first-type signal.

In one embodiment, the phrase "repetition" refers to an actual repetition.

In one embodiment, the phrase "repetition" refers to a nominal repetition.

In one embodiment, the first bit block comprises a positive integer number of bit(s).

In one embodiment, the first bit block comprises a Transport Block (TB).

In one embodiment, the first bit block comprises at least one Transport Block (TB).

In one embodiment, the first bit block comprises at least one Code Block Group (CBG).

In one embodiment, a first bit block repetition is obtained by the first bit block sequentially through CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, a first bit block repetition is obtained by the first bit block sequentially through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, a first bit block repetition is obtained by the first bit block sequentially through CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, a Redundancy Version (RV) value of the first signal and an RV value of the second signal are two consecutive candidate values among a group of candidate values.

In one embodiment, frequency-domain resources occupied by the first signal and frequency-domain resources occupied by the second signal belong to a same Band Width Part (BWP).

In one subembodiment, two first-type signals belong to the same BWP in frequency domain.

In one embodiment, frequency-domain resources occupied by the first signal and frequency-domain resources occupied by the second signal belong to a same BWP group, the BWP group comprising at least one BWP.

In one subembodiment, two first-type signals belong to the same BWP group in frequency domain.

In one embodiment, frequency-domain resources occupied by the first signal and frequency-domain resources occupied by the second signal belong to a same carrier.

In one subembodiment, two first-type signals belong to the same carrier in frequency domain.

In one embodiment, frequency-domain resources occupied by the first signal and frequency-domain resources occupied by the second signal belong to a same carrier group, the carrier group comprising at least one carrier.

In one subembodiment, two first-type signals belong to the same carrier group in frequency domain.

In one embodiment, frequency-domain resources occupied by the first signal and frequency-domain resources occupied by the second signal belong to a same serving cell.

In one subembodiment, two first-type signals belong to the same serving cell in frequency domain.

In one embodiment, frequency-domain resources occupied by the first signal and frequency-domain resources occupied by the second signal belong to a same serving cell group, the serving cell group comprising at least one serving cell.

In one subembodiment, two first-type signals belong to the same serving cell group in frequency domain.

In one embodiment, the phrase "occupied time-domain resources" refers to: occupied symbols.

In one embodiment, the phrase "occupied time-domain resources" refers to: occupied time.

In one embodiment, the phrase "occupied time-domain resources" refers to: a slot belonging to in time domain.

In one embodiment, the phrase "occupied frequency-domain resources" refers to: occupied RBs.

In one embodiment, the phrase "occupied frequency-domain resources" refers to: occupied subcarriers.

In one embodiment, the phrase "occupied time-frequency resources" refers to: occupied REs.

In one embodiment, the phrase "power consistency" refers to: power consistency.

In one embodiment, the phrase "power consistency" refers to: having consistent power.

In one embodiment, the phrase "power consistency" refers to: the same power.

In one embodiment, the phrase "power consistency" refers to: the same transmit power.

In one embodiment, the phrase "power consistency" refers to: the same power.

In one embodiment, the phrase "phase continuity" refers to: phase continuity.

In one embodiment, the phrase "phase continuity" refers to: having continuous phases.

In one embodiment, the phrase "phase continuity" refers to: phases being continuous according to an order from early to late time.

In one embodiment, the phrase "phase continuity" refers to: phases being continuous according to an order from late to early time.

In one embodiment, the sentence that "the first node maintains power consistency and phase continuity between multiple first-type signals that belong to a same first-type time window in time domain" means that: the first node is expected to maintain power consistency and phase continuity between multiple first-type signals that belong to a same first-type time window in time domain.

In one embodiment, the sentence that "the first node maintains power consistency and phase continuity between multiple first-type signals that belong to a same first-type time window in time domain" means that: the first node is assumed to maintain power consistency and phase continuity between multiple first-type signals that belong to a same first-type time window in time domain.

In one embodiment, the sentence that "the first node is expected to maintain power consistency and phase continuity between multiple first-type signals that belong to a same first-type time window in time domain" means that: the first node actually maintains power consistency and phase continuity between multiple first-type signals that belong to a same first-type time window in time domain.

In one embodiment, the sentence that "the first node is expected to maintain power consistency and phase continuity between multiple first-type signals that belong to a same first-type time window in time domain" means that: the first node itself determines whether it actually maintains power consistency and phase continuity between multiple first-type signals that belong to a same first-type time window in time domain.

In one embodiment, the sentence that "the first node is expected to maintain power consistency and phase continuity between multiple first-type signals that belong to a same first-type time window in time domain" means that: power consistency and phase continuity are maintained between multiple first-type signals that belong to a same first-type time window in time domain.

In one embodiment, the sentence that "the first node is expected to maintain power consistency and phase continuity between multiple first-type signals that belong to a same first-type time window in time domain" means that: the first node itself determines whether power consistency and phase continuity are maintained between multiple first-type signals that belong to a same first-type time window in time domain.

In one embodiment, the sentence that "the first node is expected to maintain power consistency and phase continuity between multiple first-type signals that belong to a same first-type time window in time domain" means that: a target receiver of the first signal and the second signal receives the first signal and the second signal under a first assumption.

In one embodiment, the sentence that "the first node is expected to maintain power consistency and phase continuity between multiple first-type signals that belong to a same first-type time window in time domain" means that: a target receiver of the first signal and the second signal receives multiple first-type signals in a same first-type time window under a first assumption.

In one embodiment, the sentence that "the first node is assumed to maintain power consistency and phase continuity between multiple first-type signals that belong to a same first-type time window in time domain" means that: the first node actually maintains power consistency and phase continuity between multiple first-type signals that belong to a same first-type time window in time domain.

In one embodiment, the sentence that "the first node is assumed to maintain power consistency and phase continuity between multiple first-type signals that belong to a same first-type time window in time domain" means that: the first node itself determines whether it actually maintains power consistency and phase continuity between multiple first-type signals that belong to a same first-type time window in time domain.

In one embodiment, the sentence that "the first node is assumed to maintain power consistency and phase continuity between multiple first-type signals that belong to a same first-type time window in time domain" means that: power consistency and phase continuity are maintained between multiple first-type signals that belong to a same first-type time window in time domain.

In one embodiment, the sentence that "the first node is assumed to maintain power consistency and phase continuity between multiple first-type signals that belong to a same first-type time window in time domain" means that: the first node itself determines whether power consistency and phase continuity are maintained between multiple first-type signals that belong to a same first-type time window in time domain.

In one embodiment, the sentence that "the first node is assumed to maintain power consistency and phase continuity between multiple first-type signals that belong to a same first-type time window in time domain" means that: a target receiver of the first signal and the second signal receives the first signal and the second signal under a first assumption.

In one embodiment, the sentence that "the first node is assumed to maintain power consistency and phase continuity between multiple first-type signals that belong to a same first-type time window in time domain" means that: a target receiver of the first signal and the second signal receives multiple first-type signals in a same first-type time window under a first assumption.

In one embodiment, the first assumption includes that the first node maintains power consistency and phase continuity between multiple first-type signals that belong to a same first-type time window in time domain.

In one embodiment, the first assumption includes that power consistency and phase continuity are maintained between multiple first-type signals that belong to a same first-type time window in time domain.

In one embodiment, the sentence that "the first node maintains power consistency and phase continuity between multiple first-type signals that belong to a same first-type time window in time domain" means that: the first node is not expected to maintain power consistency and phase continuity between two first-type signals that respectively belong to different first-type time windows in time domain.

In one embodiment, the sentence that "the first node maintains power consistency and phase continuity between multiple first-type signals that belong to a same first-type time window in time domain" means that: the first node is not assumed to maintain power consistency and phase continuity between two first-type signals that respectively belong to different first-type time windows in time domain.

In one embodiment, the sentence that "the first node is not expected to maintain power consistency and phase continuity between two first-type signals that respectively belong to different first-type time windows in time domain" means that: the first node actually does not maintain power consistency and phase continuity between two first-type signals that respectively belong to different first-type time windows in time domain.

In one embodiment, the sentence that "the first node is not expected to maintain power consistency and phase continuity between two first-type signals that respectively belong to different first-type time windows in time domain" means that: the first node itself determines whether it actually does not maintain power consistency and phase continuity between two first-type signals that respectively belong to different first-type time windows in time domain.

In one embodiment, the sentence that "the first node is not expected to maintain power consistency and phase continuity between two first-type signals that respectively belong to different first-type time windows in time domain" means that: power consistency and phase continuity are not maintained between two first-type signals that respectively belong to different first-type time windows in time domain.

In one embodiment, the sentence that "the first node is not expected to maintain power consistency and phase continuity between two first-type signals that respectively belong to different first-type time windows in time domain" means that: the first node itself determines whether it does not maintain power consistency and phase continuity between two first-type signals that respectively belong to different first-type time windows in time domain.

In one embodiment, the sentence that "the first node is not expected to maintain power consistency and phase continuity between two first-type signals that respectively belong to different first-type time windows in time domain" means that: a target receiver of the first signal and the second signal receives two first-type signals that respectively belong to different first-type time windows in time domain under a second assumption.

In one embodiment, the sentence that "the first node is not assumed to maintain power consistency and phase continuity between two first-type signals that respectively belong to different first-type time windows in time domain" means that: the first node actually does not maintain power consistency and phase continuity between two first-type signals that respectively belong to different first-type time windows in time domain.

In one embodiment, the sentence that "the first node is not assumed to maintain power consistency and phase continuity between two first-type signals that respectively belong to different first-type time windows in time domain" means that: the first node itself determines whether it actually does not maintain power consistency and phase continuity between two first-type signals that respectively belong to different first-type time windows in time domain.

In one embodiment, the sentence that "the first node is not assumed to maintain power consistency and phase continuity between two first-type signals that respectively belong to different first-type time windows in time domain" means that: power consistency and phase continuity are not maintained between two first-type signals that respectively belong to different first-type time windows in time domain.

In one embodiment, the sentence that "the first node is not assumed to maintain power consistency and phase continuity between two first-type signals that respectively belong to different first-type time windows in time domain" means that: the first node itself determines whether it does not maintain power consistency and phase continuity between two first-type signals that respectively belong to different first-type time windows in time domain.

In one embodiment, the sentence that "the first node is not assumed to maintain power consistency and phase continuity between two first-type signals that respectively belong to different first-type time windows in time domain" means that: a target receiver of the first signal and the second signal receives two first-type signals that respectively belong to different first-type time windows in time domain under a second assumption.

In one embodiment, the second assumption includes that the first node does not maintain power consistency and phase continuity between two first-type signals that respectively belong to different first-type time windows in time domain.

In one embodiment, the second assumption includes that power consistency and phase continuity are not maintained between two first-type signals that respectively belong to different first-type time windows in time domain.

Embodiment 2

Figure 2:
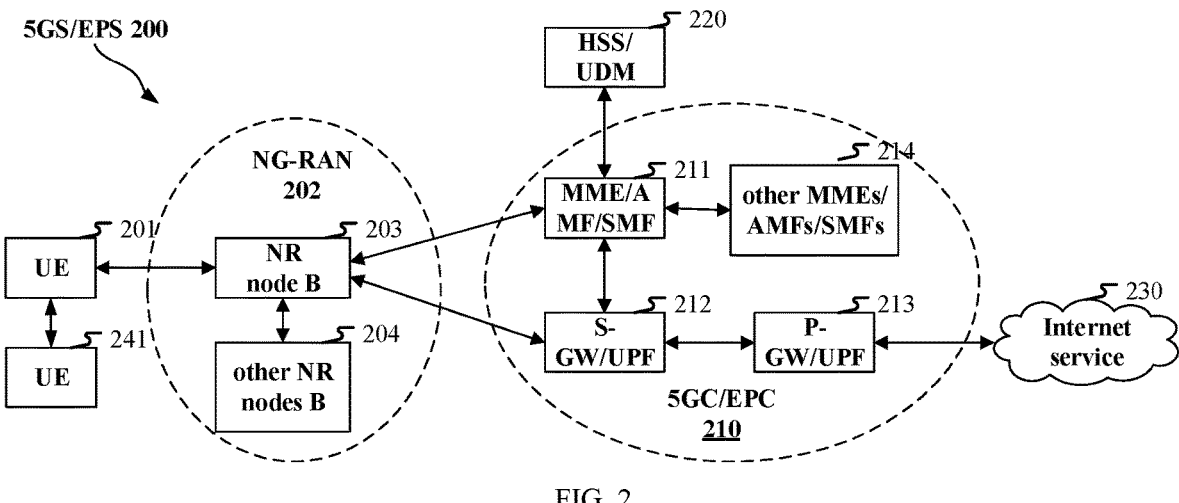
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HS S/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB 203.

Embodiment 3

Figure 3:
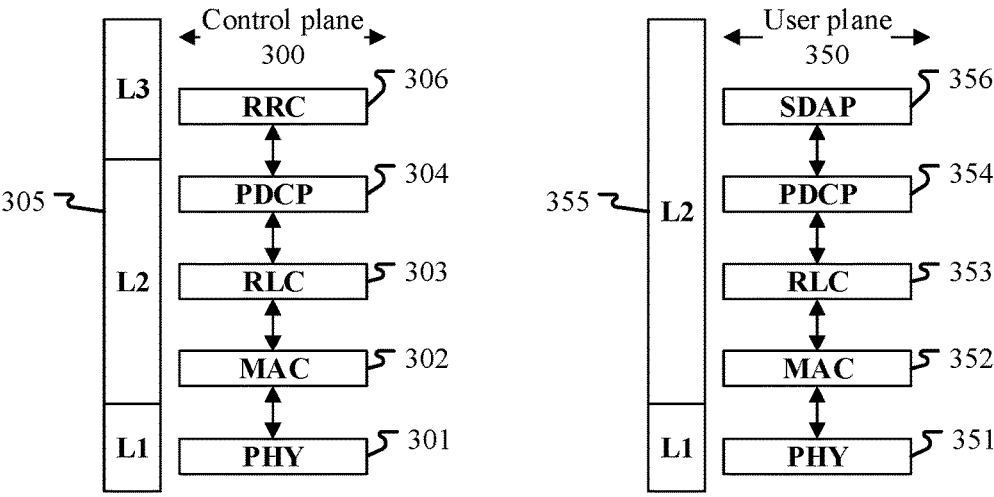
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301, or the PHY 351.

In one embodiment, the first signaling is generated by the RRC sublayer 306.

In one embodiment, the first signal is generated by the PHY 301, or the PHY 351.

In one embodiment, the second signal is generated by the PHY 301, or the PHY 351.

In one embodiment, the first demodulation reference signal is generated by the PHY 301, or the PHY 351.

In one embodiment, the second demodulation reference signal is generated by the PHY 301, or the PHY 351.

Embodiment 4

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first signaling; and transmits a first signal and a second signal respectively in a first time-domain resource block and a second time-domain resource block; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, the second communication device 450 comprises a memory that stores a computer readable instruction program, the computer readable instruction program generates actions when executed by at least one processor, which include: receiving a first signaling; and transmitting a first signal and a second signal respectively in a first time-domain resource block and a second time-domain resource block; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first signaling; and receives a first signal and a second signal respectively in a first time-domain resource block and a second time-domain resource block; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

In one embodiment, the first communication device 410 comprises a memory that stores a computer readable instruction program, the computer readable instruction program generates actions when executed by at least one processor, which include: transmitting a first signaling; and receiving a first signal and a second signal respectively in a first time-domain resource block and a second time-domain resource block; herein, the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the transmitter 454, the transmitting processor 468, the multi-antenna transmitting processor 457, the controller/processor 459, or the memory 460 is used for transmitting the first signal and the second signal respectively in the first time-domain resource block and the second time-domain resource block in the present application; at least one of the antenna 420, the receiver 418, the receiving processor 470, the multi-antenna receiving processor 472, the controller/processor 475, or the memory 476 is used for receiving the first signal and the second signal respectively in the first time-domain resource block and the second time-domain resource block in the present application.

In one embodiment, at least one of the antenna 452, the transmitter 454, the transmitting processor 468, the multi-antenna transmitting processor 457, the controller/processor 459, or the memory 460 is used for transmitting the first demodulation reference signal and the second demodulation reference signal respectively in the first time-domain resource block and the second time-domain resource block in the present application; at least one of the antenna 420, the receiver 418, the receiving processor 470, the multi-antenna receiving processor 472, the controller/processor 475, or the memory 476 is used for receiving the first demodulation reference signal and the second demodulation reference signal respectively in the first time-domain resource block and the second time-domain resource block in the present application.

Embodiment 5

Embodiment 5 illustrates a flowchart of wireless transmission according to one embodiment of the present application, as shown in FIG. 5. In FIG. 5, a first node U01 and a second node N02 are respectively two communication nodes that transmit via an air interface; herein, steps marked by the box F1 are optional.

The first node U01 receives a first signaling in step S5101; transmits a first signal and a second signal respectively in a first time-domain resource block and a second time-domain resource block in step S5102; and transmits a first demodulation reference signal and a second demodulation reference signal respectively in a first time-domain resource block and a second time-domain resource block in step S5103.

The second node N02 transmits a first signaling in step S5201; receives a first signal and a second signal respectively in a first time-domain resource block and a second time-domain resource block in step S5202; and receives a first demodulation reference signal and a second demodulation reference signal respectively in the first time-domain resource block and the second time-domain resource block in step S5203.

In Embodiment 5, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

In one embodiment, whether a first condition set is satisfied is used by the first node U01 to determine a number of first-type time window(s) comprised by the reference time window.

In one embodiment, whether a first condition set is satisfied is used by the second node N02 to determine a number of first-type time window(s) comprised by the reference time window.

In one embodiment, whether the first transmitter transmits demodulation reference signals in both the first time-domain resource block and the second time-domain resource block is related to whether the first condition set is satisfied; when the first condition set is not satisfied, the first transmitter transmits a demodulation reference signal only in one of the first time-domain resource block and the second time-domain resource block; when the first condition set is satisfied, the first transmitter transmits a demodulation reference signal for demodulating the first signal and a demodulation reference signal for demodulating the second signal respectively in the first time-domain resource block and the second time-domain resource block.

In one embodiment, whether the first transmitter transmits demodulation reference signals in both the first time-domain resource block and the second time-domain resource block is related to whether the first time-domain resource block and the second time-domain resource block belong to a same first-type time window; when the first time-domain resource block and the second time-domain resource block belong to a same first-type time window, the first transmitter transmits a demodulation reference signal only in one of the first time-domain resource block and the second time-domain resource block; when the first time-domain resource block and the second time-domain resource block belong to different first-type time windows, the first transmitter transmits a demodulation reference signal for demodulating the first signal and a demodulation reference signal for demodulating the second signal respectively in the first time-domain resource block and the second time-domain resource block.

In one embodiment, when the first condition set is not satisfied, a same demodulation reference signal is used for demodulating the first signal and the second signal, and the first transmitter transmits the same demodulation reference signal only in one of the first time-domain resource block and the second time-domain resource block; when the first condition set is satisfied, the first transmitter transmits a demodulation reference signal for demodulating the first signal in the first time-domain resource block, and the first transmitter transmits a first demodulation reference signal and a second demodulation reference signal respectively in the first time-domain resource block and the second time-domain resource block, the first demodulation reference signal and the second demodulation reference signal being respectively used for demodulating the first signal and the second signal.

In one embodiment, when the first time-domain resource block and the second time-domain resource block belong to a same first-type time window, a same demodulation reference signal is used for demodulating the first signal and the second signal, and the first transmitter transmits the same demodulation reference signal only in one of the first time-domain resource block and the second time-domain resource block; when the first time-domain resource block and the second time-domain resource block respectively belong to different first-type time windows, the first transmitter transmits a demodulation reference signal for demodulating the first signal in the first time-domain resource block, and the first transmitter transmits a first demodulation reference signal and a second demodulation reference signal respectively in the first time-domain resource block and the second time-domain resource block, the first demodulation reference signal and the second demodulation reference signal being respectively used for demodulating the first signal and the second signal.

Embodiment 6

Embodiment 6 illustrates a schematic diagram of a relation between a first condition set and a first-type time window according to one embodiment of the present application; as shown in FIG. 6.

In Embodiment 6, whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window.

In one embodiment, the first time-domain resource block belongs to a first-type time window, and the second time-domain resource block belongs to a first-type time window.

In one embodiment, the first time-domain resource block and the second time-domain resource block respectively belong to different first-type time windows.

In one embodiment, the first time-domain resource block and the second time-domain resource block belong to a same first-type time window.

In one embodiment, a first-type time window comprises at least one symbol.

In one embodiment, a first-type time window comprises one symbol or multiple consecutive symbols.

In one embodiment, a first-type time window comprises multiple consecutive symbols.

In one embodiment, a first-type time window comprises a contiguous period of time.

In one embodiment, a duration of a first-type time window is no greater than a first threshold.

In one embodiment, a number of symbols comprised by a first-type time window is no greater than a first threshold.

In one embodiment, a first-type time window is used for at least one first bit block repetition.

In one embodiment, a first-type time window is used for at least one bit block repetition.

In one embodiment, a first-type time window is used for at least one PUSCH transmission.

In one embodiment, a first-type time window is used for at least one PUSCH repetition.

In one embodiment, a first-type time window is used for at least one PUCCH transmission.

In one embodiment, a first-type time window is used for at least one PUCCH repetition.

In one embodiment, a duration of a first-type time window is no smaller than a duration of the first time-domain resource block, and is no smaller than a duration of the second time-domain resource block.

In one embodiment, a number of symbols comprised by a first-type time window is no less than a number of symbols comprised by the first time-domain resource block, and is no less than a number of symbols comprised by the second time-domain resource block.

In one embodiment, the reference time window comprises at least one first-type time window, and a duration of one first-type time window is no greater than a duration of the reference time window.

In one embodiment, the reference time window comprises at least one first-type time window, and a number of symbols comprised by one first-type time window is no greater than a number of symbols comprised by the reference time window.

Embodiment 7

Embodiment 7 illustrates a schematic diagram of a relation between a first condition set and a first-type time window according to another embodiment of the present application; as shown in FIG. 7.

In Embodiment 7, when the first condition set is satisfied, the first time-domain resource block and the second time-domain resource block respectively belong to different first-type time windows; when the first condition set is not satisfied, the first time-domain resource block and the second time-domain resource block belong to a same first-type time window.

In one embodiment, the first time-domain resource block belongs to a first-type time window, and the second time-domain resource block belongs to a first-type time window; whether the first condition set is satisfied is used to determine whether the first time-domain resource block and the second time-domain resource block belong to the same first-type time window.

Embodiment 8

Embodiment 8 illustrates a schematic diagram of a first condition set according to one embodiment of the present application; as shown in FIG. 8.

In Embodiment 8, the first condition set comprises a first condition, the first condition comprising that the first node transmits a third signal in a third time-domain resource block and the third time-domain resource block is overlapped with only one of the first time-domain resource block or the second time-domain resource block.

In one embodiment, when the first condition is satisfied, the first condition set is satisfied.

In one embodiment, when the first condition is not satisfied, the first condition set is not satisfied.

In one embodiment, the first condition set only comprises a first condition.

In one subembodiment, when the first condition is satisfied, the first condition set is satisfied; when the first condition is not satisfied, the first condition set is not satisfied.

In one embodiment, the first condition set also comprises one condition other than the first condition.

In one embodiment, the first condition set comprises more than one condition, and the first condition is a condition in the first condition set; when there is one condition in the first condition set being satisfied, the first condition set is satisfied; when none of conditions in the first condition set is satisfied, the first condition set is not satisfied.

In one embodiment, the third signal comprises an uplink transmission.

In one embodiment, the third signal comprises a PUSCH transmission.

In one embodiment, the third signal comprises a PUCCH transmission.

In one embodiment, the third signal comprises an uplink reference signal.

In one embodiment, the third signal comprises a Physical random access channel (PRACH) transmission.

In one embodiment, the third signal comprises a Sounding Reference Signal (SRS) resource.

In one embodiment, the third signal is unrelated to the first signaling.

In one embodiment, the third signal is indicated by a signaling other than the first signaling.

In one embodiment, the third time-domain resource block is indicated by a signaling other than the first signaling.

In one embodiment, the third time-domain resource block is indicated by a DCI signaling other than the first signaling.

In one embodiment, the third time-domain resource block is indicated by a physical-layer signaling other than the first signaling.

In one embodiment, the third time-domain resource block is indicated by a higher-layer signaling other than the first signaling.

In one embodiment, the third time-domain resource block is indicated by an RRC signaling other than the first signaling.

In one embodiment, the meaning of the sentence that "the third time-domain resource block is overlapped with only one of the first time-domain resource block or the second time-domain resource block" includes: the third time-domain resource block is overlapped with the first time-domain resource block, and is orthogonal with the second time-domain resource block.

In one embodiment, the meaning of the sentence that "the third time-domain resource block is overlapped with only one of the first time-domain resource block or the second time-domain resource block" includes: the third time-domain resource block is overlapped with the second time-domain resource block, and is orthogonal with the first time-domain resource block.

In one embodiment, when the third time-domain resource block is overlapped with both the first time-domain resource block and the second time-domain resource block, the first condition is not satisfied.

In one embodiment, the meaning of "two time-domain resource blocks being overlapped" includes: the two time-domain resource blocks comprise one identical symbol.

In one embodiment, the meaning of "two time-domain resource blocks being overlapped" includes: the two time-domain resource blocks comprise at least one identical symbol.

In one embodiment, the meaning of "two time-domain resource blocks being overlapped" includes: the two time-domain resource blocks comprise one identical time.

In one embodiment, the meaning of "two time-domain resource blocks being overlapped" includes: the two time-domain resource blocks comprise at least one identical time.

In one embodiment, the meaning of "two time-domain resource blocks being orthogonal" includes: the two time-domain resource blocks do not comprise any one identical symbol.

In one embodiment, the meaning of "two time-domain resource blocks being orthogonal" includes: the two time-domain resource blocks do not comprise any one identical time.

Embodiment 9

Embodiment 9 illustrates a schematic diagram of a first condition set according to another embodiment of the present application; as shown in FIG. 9.

In Embodiment 9, the first condition set comprises a first condition, the first condition comprising that the first node transmits a third signal in a third time-domain resource block and the third time-domain resource block is overlapped with only one of the first time-domain resource block or the second time-domain resource block; the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

In one embodiment, any reference signal set of the Q reference signal sets consists of at least one reference signal.

In one embodiment, any reference signal set of the Q reference signal sets consists of SRS.

In one embodiment, any reference signal set of the Q reference signal sets consists of at least one of SRS, a Channel State Information-Reference Signal (CSI-RS) or a Synchronization Signal/Physical broadcast channel (SS/PBCH).

In one embodiment, Q is equal to 2.

In one embodiment, Q is greater than 2.

In one embodiment, the phrase that "a given reference signal is used to determine a spatial relation of a given signal" means that: a Transmission configuration indication (TCI) state of the given reference signal is identical to a TCI state of the given signal.

In one embodiment, the phrase that "a given reference signal is used to determine a spatial relation of a given signal" means that: a QCL parameter of the given reference signal is identical to a QCL parameter of the given signal.

In one embodiment, the phrase that "a given reference signal is used to determine a spatial relation of a given signal" means that: a spatial domain filter of the given reference signal is identical to a spatial domain filter of the given signal.

In one embodiment, the phrase that "a given reference signal is used to determine a spatial relation of a given signal" means that: the first node receives the given reference signal and transmits the given signal using a same spatial domain filter.

In one embodiment, the phrase that "a given reference signal is used to determine a spatial relation of a given signal" means that: the first node transmits the given reference signal and transmits the given signal using a same spatial domain filter.

In one embodiment, the phrase that "a given reference signal is used to determine a spatial relation of a given signal" means that: a spatial parameter of the given reference signal is identical to a spatial parameter of the given signal.

In one embodiment, the phrase that "a given reference signal is used to determine a spatial relation of a given signal" means that: a spatial Rx parameter of the given reference signal is identical to a spatial Tx parameter of the given signal.

In one embodiment, the phrase that "a given reference signal is used to determine a spatial relation of a given signal" means that: a spatial Tx parameter of the given reference signal is identical to a spatial Tx parameter of the given signal.

In one embodiment, the phrase that "a given reference signal is used to determine a spatial relation of a given signal" means that: a measurement of the given reference signal is used for calculating precoding of the given signal.

In one embodiment, the spatial relation comprises a Transmission Configuration Indication (TCI) state.

In one embodiment, the spatial relation comprises a QCL parameter.

In one embodiment, the spatial relation comprises a QCL relation.

In one embodiment, the spatial relation comprises a QCL assumption.

In one embodiment, the spatial relation comprises a spatial domain filter.

In one embodiment, the spatial domain filter comprises a spatial domain transmission filter.

In one embodiment, the spatial domain filter comprises a spatial domain reception filter.

In one embodiment, the spatial relation comprises a Spatial Tx parameter.

In one embodiment, the spatial relation comprises a Spatial Rx parameter.

In one embodiment, the spatial relation comprises transmission antenna port(s).

In one embodiment, the spatial relation comprises precoding.

In one embodiment, the spatial relation comprises large-scale properties.

In one embodiment, the Spatial Tx parameters include one or more of a transmission antenna port, a transmission antenna port group, a transmission analog beamforming matrix, a transmission analog beamforming vector, a transmission beamforming matrix, a transmission beamforming vector or Tx spatial filtering.

In one embodiment, the Spatial Rx parameters include one or more of a receiving beam, a reception analog beamforming matrix, a reception analog beamforming vector, a reception beamforming matrix, a reception beamforming vector or a Rx spatial filtering.

In one embodiment, the large-scale properties include one or more of a delay spread, a Doppler spread, a Doppler shift, an average delay or a Spatial Rx parameter.

In one embodiment, the QCL refers to being Quasi Co-Located.

In one embodiment, the QCL refers to Quasi Co-Location.

In one embodiment, the QCL parameter includes one or more of a delay spread, a Doppler spread, a Doppler shift, an average delay or a Spatial Rx parameter.

In one embodiment, the QCL parameter includes a Doppler shift and a Doppler spread.

In one embodiment, the QCL parameter includes a Doppler shift and an average delay.

In one embodiment, the QCL parameter includes a Spatial Rx parameter.

In one embodiment, a QCL parameter of QCL-TypeA includes a Doppler shift, a Doppler spread, an average delay, and a delay spread.

In one embodiment, a QCL parameter of QCL-TypeB includes a Doppler shift and a Doppler spread.

In one embodiment, a QCL parameter of QCL-TypeC includes a Doppler shift and an average delay.

In one embodiment, a QCL parameter of QCL-TypeD includes a Spatial Rx parameter.

In one embodiment, the QCL type includes QCL-TypeA, QCL-TypeB, QCL-TypeC and QCL-T eD.

In one embodiment, for detailed meaning of the QCL-TypeA, the QCL-TypeB, the QCL-TypeC and the QCL-TypeD, refer to 3GPP TS38.214, Section 5.1.5.

In one embodiment, the given reference signal is a CSI-RS.

In one embodiment, the given reference signal is a SS/PBCH block.

In one embodiment, the given reference signal is an SRS.

In one embodiment, the given reference signal is one of a CSI-RS, a SS/PBCH block or an SRS.

In one embodiment, the given reference signal is a CSI-RS or a SS/PBCH block.

In one embodiment, the given reference signal is a reference signal in the Q reference signal sets.

In one embodiment, the given signal is the first signal.

In one embodiment, the given signal is the third signal.

In one embodiment, the given signal is the target signal.

In one embodiment, a TCI state indicates reference signals corresponding to at least one QCL type.

In one embodiment, for the detailed meaning of the TCI state, refer to 3GPP TS38.214, Section 5.1.5.

Embodiment 10

Embodiment 10 illustrates a schematic diagram of a first condition set according to a third embodiment of the present application; as shown in FIG. 10.

In Embodiment 10, the first condition set comprises more than one condition, and the first condition is a condition in the first condition set; when there is one condition in the first condition set being satisfied, the first condition set is satisfied; the first condition set also comprises a second condition, the second condition being a condition in the first condition set; the second condition comprises that frequency-domain resources occupied by the first signal are different from frequency-domain resources occupied by the second signal.

In one embodiment, the sentence that "frequency-domain resources occupied by the first signal are different from frequency-domain resources occupied by the second signal" means that: frequency-domain resources occupied by the first signal and frequency-domain resources occupied by the second signal are orthogonal.

In one embodiment, the sentence that "frequency-domain resources occupied by the first signal are different from frequency-domain resources occupied by the second signal" means that: frequency-domain resources occupied by the first signal and frequency-domain resources occupied by the second signal are not completely the same.

In one embodiment, the sentence that "frequency-domain resources occupied by the first signal are different from frequency-domain resources occupied by the second signal" means that: there exists one subcarrier that belongs to frequency-domain resources occupied by the first signal but does not belong to frequency-domain resources occupied by the second signal.

In one embodiment, the sentence that "frequency-domain resources occupied by the first signal are different from frequency-domain resources occupied by the second signal" means that: there exists one subcarrier that belongs to frequency-domain resources occupied by the second signal but does not belong to frequency-domain resources occupied by the first signal.

In one embodiment, the sentence that "frequency-domain resources occupied by the first signal are different from frequency-domain resources occupied by the second signal" means that: any subcarrier occupied by the first signal does not belong to frequency-domain resources occupied by the second signal.

In one embodiment, the meaning of "two frequency-domain resource blocks being orthogonal" includes: the two frequency-domain resource blocks do not comprise any one identical subcarrier.

In one embodiment, the meaning of "two frequency-domain resource blocks being orthogonal" includes: the two frequency-domain resource blocks do not comprise any one identical frequency point.

In one embodiment, the first condition set comprises only the first condition and the second condition.

In one embodiment, the first condition set also comprises a condition other than the first condition and the second condition.

Embodiment 11

Embodiment 11 illustrates a schematic diagram of a first condition set according to a fourth embodiment of the present application; as shown in FIG. 11.

In Embodiment 11, the first condition set comprises more than one condition, and the first condition is a condition in the first condition set; when there is one condition in the first condition set being satisfied, the first condition set is satisfied; the first condition set also comprises a third condition, the third condition being a condition in the first condition set; the third condition comprises that different reference signals are respectively used to determine a spatial relation of the first signal and a spatial relation of the second signal.

In one embodiment, the first condition set comprises the first condition and the third condition.

In one embodiment, the first condition set also comprises a condition other than the first condition and the third condition.

In one embodiment, the first condition set comprises the first condition, the second condition and the third condition.

In one embodiment, the first condition set also comprises a condition other than the first condition, the second condition and the third condition.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where an identity of the first reference signal is different from an identity of the second reference signal.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where the first reference signal and the second reference signal are non-QCL.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where a QCL parameter of the first reference signal is different from a QCL parameter of the second reference signal.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where a spatial domain filter of the first reference signal is different from a spatial domain filter of the second reference signal.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where a spatial Tx parameter of the first reference signal is different from a spatial Tx parameter of the second reference signal.

In one embodiment, the sentence that "different reference signals are respectively used to determine a spatial relation of the first signal and a spatial relation of the second signal" means that: a first reference signal is used to determine a spatial relation of the first signal, while a second reference signal is used to determine a spatial relation of the second signal, where a spatial Rx parameter of the first reference signal is different from a spatial Rx parameter of the second reference signal.

In one embodiment, the sentence that "different reference signals are respectively used to determine a spatial relation of the first signal and a spatial relation of the second signal" means that: a first reference signal is used to determine a spatial relation of the first signal, while a second reference signal signal is used to determine a spatial relation of the second signal, where a spatial Tx parameter or a spatial Rx parameter of the first reference signal is different from a spatial Tx parameter or a spatial Rx parameter of the second reference signal.

In one embodiment, an identity of the first reference signal is one of an NZP-CSI-RS-ResourceId, an SSB-Index or an SRS-ResourceId, and an identity of the second reference signal is one of an NZP-CSI-RS-ResourceId, an SSB-Index or an SRS-ResourceId.

In one embodiment, the first reference signal is one of a CSI-RS, a SS/PBCH block or an SRS, and the second reference signal is one of a CSI-RS, a SS/PBCH block or an SRS.

In one embodiment, the first reference signal is an SRS, and the second reference signal is an SRS.

Embodiment 12

Embodiment 12 illustrates a schematic diagram of a demodulation reference signal for demodulating the first signal and a demodulation reference signal for demodulating the second signal according to one embodiment of the present application; as shown in FIG. 12.

In Embodiment 12, the first transmitter also transmits a first demodulation reference signal and a second demodulation reference signal respectively in the first time-domain resource block and the second time-domain resource block; herein, when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

In one embodiment, the first demodulation reference signal and the second demodulation reference signal respectively belong to the first time-domain resource block and the second time-domain resource block in time domain.

In one embodiment, whether a DeModulation Reference Signal (DMRS) for demodulating the first signal and a DMRS for demodulating the second signal are identical is related to whether the first time-domain resource block and the second time-domain resource block belong to a same first-type time window.

In one embodiment, when the first time-domain resource block and the second time-domain resource block belong to a same first-type time window, each of a DMRS for demodulating the first signal and a DMRS for demodulating the second signal includes the first demodulation reference signal and the second demodulation reference signal.

Embodiment 13

Embodiment 13 illustrates a schematic diagram of time-frequency resources occupied by a first demodulation reference signal and time-frequency resources occupied by a second demodulation reference signal according to one embodiment of the present application; as shown in FIG. 13.

In Embodiment 13, time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

In one embodiment, the sentence that "the first demodulation reference signal pattern is different from the second demodulation reference signal pattern" means that: frequency-domain density of the first demodulation reference signal pattern is different from that of the second demodulation reference signal pattern.

In one embodiment, the sentence that "the first demodulation reference signal pattern is different from the second demodulation reference signal pattern" means that: frequency-domain density of the first demodulation reference signal pattern is no greater than that of the second demodulation reference signal pattern.

In one embodiment, the sentence that "the first demodulation reference signal pattern is different from the second demodulation reference signal pattern" means that: frequency-domain density of the first demodulation reference signal pattern is smaller than that of the second demodulation reference signal pattern.

In one embodiment, the first signaling is used for indicating a second demodulation reference signal pattern.

In one embodiment, the first signaling is used for indicating only the second demodulation reference signal pattern of a second demodulation reference signal pattern and the first demodulation reference signal pattern.

In one embodiment, the first demodulation reference signal pattern is pre-defined.

In one embodiment, the first demodulation reference signal pattern is configured by a higher layer signaling.

In one embodiment, the second demodulation reference signal pattern is configured by a higher layer signaling.

In one embodiment, the second demodulation reference signal pattern is related to the first demodulation reference signal pattern.

In one embodiment, the second demodulation reference signal pattern is used to determine the first demodulation reference signal pattern.

In one embodiment, the first demodulation reference signal pattern comprises a number of symbols occupied in a reference time-frequency resource block, and the second demodulation reference signal pattern comprises a number of symbols occupied in the reference time-frequency resource block.

In one embodiment, the first demodulation reference signal pattern comprises symbols occupied in a reference time-frequency resource block, and the second demodulation reference signal pattern comprises symbols occupied in the reference time-frequency resource block.

In one embodiment, the first demodulation reference signal pattern comprises subcarriers occupied in a reference time-frequency resource block, and the second demodulation reference signal pattern comprises subcarriers occupied in the reference time-frequency resource block.

In one embodiment, the first demodulation reference signal pattern comprises Resource Elements (REs) occupied in a reference time-frequency resource block, and the second demodulation reference signal pattern comprises REs occupied in the reference time-frequency resource block.

In one embodiment, the reference time-frequency resource block comprises at least one Resource Block (RB) in frequency domain.

In one embodiment, the reference time-frequency resource block comprises one RB in frequency domain.

In one embodiment, the reference time-frequency resource block comprises multiple consecutive RBs in frequency domain.

In one embodiment, the reference time-frequency resource block comprises one or multiple consecutive RBs in frequency domain.

In one embodiment, the reference time-frequency resource block comprises at least one symbol in time domain.

In one embodiment, the reference time-frequency resource block comprises multiple consecutive symbols in time domain.

In one embodiment, the reference time-frequency resource block comprises one or multiple consecutive symbols in time domain.

In one embodiment, the sentence that "the first demodulation reference signal pattern is different from the second demodulation reference signal pattern" means that: REs occupied by the first demodulation reference signal pattern in a reference time-frequency resource block are different from REs occupied by the second demodulation reference signal pattern in the reference time-frequency resource block.

In one embodiment, the sentence that "the first demodulation reference signal pattern is different from the second demodulation reference signal pattern" means that: REs occupied by the first demodulation reference signal pattern in a reference time-frequency resource block are fewer than REs occupied by the second demodulation reference signal pattern in the reference time-frequency resource block.

In one embodiment, the sentence that "the first demodulation reference signal pattern is different from the second demodulation reference signal pattern" means that: subcarriers occupied by the first demodulation reference signal pattern in a reference time-frequency resource block are different from subcarriers occupied by the second demodulation reference signal pattern in the reference time-frequency resource block.

In one embodiment, the sentence that "the first demodulation reference signal pattern is different from the second demodulation reference signal pattern" means that: subcarriers occupied by the first demodulation reference signal pattern in a reference time-frequency resource block are fewer than subcarriers occupied by the second demodulation reference signal pattern in the reference time-frequency resource block.

In one embodiment, the sentence that "the first demodulation reference signal pattern is different from the second demodulation reference signal pattern" means that: a number of symbols occupied by the first demodulation reference signal pattern in a reference time-frequency resource block is different from that occupied by the second demodulation reference signal pattern in the reference time-frequency resource block.

In one embodiment, the sentence that "the first demodulation reference signal pattern is different from the second demodulation reference signal pattern" means that: symbols occupied by the first demodulation reference signal pattern in a reference time-frequency resource block are different from symbols occupied by the second demodulation reference signal pattern in the reference time-frequency resource block.

In one embodiment, the sentence that "the first demodulation reference signal pattern is different from the second demodulation reference signal pattern" means that: a number of symbols occupied by the first demodulation reference signal pattern in a reference time-frequency resource block is larger than that occupied by the second demodulation reference signal pattern in the reference time-frequency resource block.

In one embodiment, the sentence that "the first demodulation reference signal pattern is different from the second demodulation reference signal pattern" means that: subcarriers occupied by the first demodulation reference signal pattern in a reference time-frequency resource block are different from subcarriers occupied by the second demodulation reference signal pattern in the reference time-frequency resource block, while a number of symbols occupied by the first demodulation reference signal pattern in the reference time-frequency resource block is identical to that occupied by the second demodulation reference signal pattern in the reference time-frequency resource block.

In one embodiment, the sentence that "the first demodulation reference signal pattern is different from the second demodulation reference signal pattern" means that: the first demodulation reference signal pattern and the second demodulation reference signal pattern occupy the same subcarriers in a reference time-frequency resource block, while symbols occupied by the first demodulation reference signal pattern in the reference time-frequency resource block are different from symbols occupied by the second demodulation reference signal pattern in the reference time-frequency resource block.

In one embodiment, the sentence that "the first demodulation reference signal pattern is different from the second demodulation reference signal pattern" means that: the first demodulation reference signal pattern and the second demodulation reference signal pattern occupy the same subcarriers in a reference time-frequency resource block, while a number of symbols occupied by the first demodulation reference signal pattern in the reference time-frequency resource block is less than a number of symbols occupied by the second demodulation reference signal pattern in the reference time-frequency resource block.

In one embodiment, the sentence that "the first demodulation reference signal pattern is different from the second demodulation reference signal pattern" means that: subcarriers occupied by the first demodulation reference signal pattern in a reference time-frequency resource block are fewer than subcarriers occupied by the second demodulation reference signal pattern in the reference time-frequency resource block, while a number of symbols occupied by the first demodulation reference signal pattern in the reference time-frequency resource block is identical to that occupied by the second demodulation reference signal pattern in the reference time-frequency resource block.

In one embodiment, the sentence that "time-frequency resources occupied by a given demodulation reference signal are determined by a given demodulation reference signal pattern" means that: a number of symbols occupied by the given demodulation reference signal in a reference time-frequency resource block is identical to that comprised in the given demodulation reference signal pattern in the reference time-frequency resource block.

In one embodiment, the sentence that "time-frequency resources occupied by a given demodulation reference signal are determined by a given demodulation reference signal pattern" means that: symbols occupied by the given demodulation reference signal in a reference time-frequency resource block are identical to symbols comprised in the given demodulation reference signal pattern in the reference time-frequency resource block.

In one embodiment, the sentence that "time-frequency resources occupied by a given demodulation reference signal are determined by a given demodulation reference signal pattern" means that: subcarriers occupied by the given demodulation reference signal in a reference time-frequency resource block are identical to subcarriers comprised in the given demodulation reference signal pattern in the reference time-frequency resource block.

In one embodiment, the sentence that "time-frequency resources occupied by a given demodulation reference signal are determined by a given demodulation reference signal pattern" means that: REs occupied by the given demodulation reference signal in a reference time-frequency resource block are identical to REs comprised in the given demodulation reference signal pattern in the reference time-frequency resource block.

In one embodiment, the reference time-frequency resource block is any time-frequency resource block in a reference resource set, and each time-frequency resource block in the reference resource set comprises at least one RE in the given demodulation reference signal, the reference resource set comprising at least one time-frequency resource block.

In one embodiment, a given demodulation reference signal is used for demodulating a given signal, and the reference time-frequency resource block is any time-frequency resource block in a reference resource set, and frequency-domain resources occupied by the reference resource set comprise frequency-domain resources occupied by the given signal, the reference resource set comprising at least one time-frequency resource block.

In one embodiment, the reference time-frequency resource block is any time-frequency resource block in a reference resource set, and frequency-domain resources occupied by the reference resource set comprise frequency-domain resources occupied by the given demodulation reference signal, the reference resource set comprising at least one time-frequency resource block.

In one embodiment, the reference resource set comprises at least one RB, the reference time-frequency resource block is an RB, and a time-frequency resource block is an RB.

In one embodiment, the reference resource set comprises more than one RB, the reference time-frequency resource block is P consecutive RBs, and a time-frequency resource block is P consecutive RBs, where P is a positive integer greater than 1.

In one embodiment, the reference resource set comprises more than one time-frequency resource block, and any two time-frequency resource blocks in the reference resource set occupy identical time-domain resources and orthogonal frequency-domain resources.

In one embodiment, the reference resource set comprises more than one time-frequency resource block, and any two time-frequency resource blocks in the reference resource set occupy identical symbols, and any two time-frequency resource blocks in the reference resource set occupy identical numbers of RBs that are orthogonal.

In one embodiment, the given demodulation reference signal is the first demodulation reference signal, and the given demodulation reference signal pattern is the first demodulation reference signal pattern.

In one embodiment, the given demodulation reference signal is the second demodulation reference signal, and the given demodulation reference signal pattern is the first demodulation reference signal pattern.

In one embodiment, the given demodulation reference signal is the first demodulation reference signal, and the given demodulation reference signal pattern is the second demodulation reference signal pattern.

In one embodiment, the given demodulation reference signal is the second demodulation reference signal, and the given demodulation reference signal pattern is the second demodulation reference signal pattern.

Embodiment 14

Embodiment 14 illustrates a schematic diagram of time-frequency resources occupied by a first demodulation reference signal and time-frequency resources occupied by a second demodulation reference signal according to one embodiment of the present application; as shown in FIG. 14.

In Embodiment 14, when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

In one embodiment, the reference time window only comprises a first time window and a second time window.

In one embodiment, the reference time window also comprises time-domain resources other than the first time window and the second time window.

In one embodiment, the reference time window also comprises at least one first-type time window other than the first time window and the second time window.

In one embodiment, the reference time window also comprises one first-type time window other than the first time window and the second time window.

In one embodiment, the meaning of the sentence that "the first time-domain resource block and the second time-domain resource block are used to determine the first time window and the second time window" includes: the first time-domain resource block is earlier than the second time-domain resource block; an end of the first time window is no earlier than an end time of the first time-domain resource block, a start of the second time window is later than an end of the first time window, and the start of the second time window is no later than a start time of the second time-domain resource block.

In one embodiment, the meaning of the sentence that "the first time-domain resource block and the second time-domain resource block are used to determine the first time window and the second time window" includes: the first time-domain resource block is earlier than the second time-domain resource block; an end of the first time window is equal to an end time of the first time-domain resource block, a start of the second time window is later than an end of the first time window, and the start of the second time window is equal to a start time of the second time-domain resource block.

In one embodiment, the meaning of the sentence that "the first time-domain resource block and the second time-domain resource block are used to determine the first time window and the second time window" includes: the second time-domain resource block is earlier than the first time-domain resource block; an end of the second time window is no earlier than an end time of the second time-domain resource block, a start of the first time window is later than an end of the second time window, and the start of the first time window is no later than a start time of the first time-domain resource block.

In one embodiment, the meaning of the sentence that "the first time-domain resource block and the second time-domain resource block are used to determine the first time window and the second time window" includes: the second time-domain resource block is earlier than the first time-domain resource block; an end of the second time window is equal to an end time of the second time-domain resource block, a start of the first time window is later than an end of the second time window, and the start of the first time window is equal to a start time of the first time-domain resource block.

In one embodiment, the meaning of the sentence that "the first time-domain resource block and the second time-domain resource block are used to determine the first time window and the second time window" includes: the first time-domain resource block is earlier than the second time-domain resource block; an ending symbol of the first time window is no earlier than an ending symbol of the first time-domain resource block, a starting symbol of the second time window is later than an ending symbol of the first time window, and the starting symbol of the second time window is no later than a starting symbol of the second time-domain resource block.

In one embodiment, the meaning of the sentence that "the first time-domain resource block and the second time-domain resource block are used to determine the first time window and the second time window" includes: the first time-domain resource block is earlier than the second time-domain resource block; an ending symbol of the first time window is equal to an ending symbol of the first time-domain resource block, a starting symbol of the second time window is later than an ending symbol of the first time window, and the starting symbol of the second time window is equal to a starting symbol of the second time-domain resource block.

In one embodiment, the meaning of the sentence that "the first time-domain resource block and the second time-domain resource block are used to determine the first time window and the second time window" includes: the second time-domain resource block is earlier than the first time-domain resource block; an ending symbol of the second time window is no earlier than an ending symbol of the second time-domain resource block, a starting symbol of the first time window is later than an ending symbol of the second time window, and the starting symbol of the first time window is no later than a starting symbol of the first time-domain resource block.

In one embodiment, the meaning of the sentence that "the first time-domain resource block and the second time-domain resource block are used to determine the first time window and the second time window" includes: the second time-domain resource block is earlier than the first time-domain resource block; an ending symbol of the second time window is equal to an ending symbol of the second time-domain resource block, a starting symbol of the first time window is later than an ending symbol of the second time window, and the starting symbol of the first time window is equal to a starting symbol of the first time-domain resource block.

Embodiment 15

Embodiment 15 illustrates a structure block diagram of a processing device used in a first node according to one embodiment of the present application; as shown in FIG. 15. In FIG. 15, a processing device 1200 in a first node is comprised of a first receiver 1201 and a first transmitter 1202.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The first receiver 1201 receives a first signaling;

the first transmitter 1202 transmits a first signal and a second signal respectively in a first time-domain resource block and a second time-domain resource block.

In Embodiment 15, the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

In one embodiment, the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

In one embodiment, the first condition set comprises more than one condition, and the first condition is a condition in the first condition set; when there is one condition in the first condition set being satisfied, the first condition set is satisfied; the first condition set also comprises a second condition, the second condition being a condition in the first condition set; the second condition comprises that frequency-domain resources occupied by the first signal are different from frequency-domain resources occupied by the second signal.

In one embodiment, the first condition set comprises more than one condition, and the first condition is a condition in the first condition set; when there is one condition in the first condition set being satisfied, the first condition set is satisfied; the first condition set also comprises a third condition, the third condition being a condition in the first condition set; the third condition comprises that different reference signals are respectively used to determine a spatial relation of the first signal and a spatial relation of the second signal.

In one embodiment, the first transmitter 1202 also transmits a first demodulation reference signal and a second demodulation reference signal respectively in the first time-domain resource block and the second time-domain resource block; herein, when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

In one embodiment, time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

In one embodiment, when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

Embodiment 16

Figure 16:
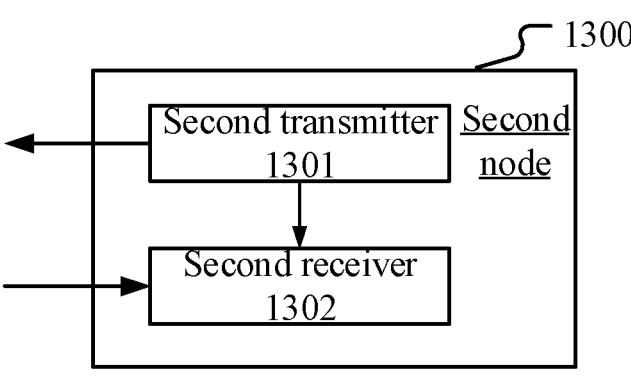
FIG. 16 illustrates a structure block diagram of a processing device used in a second node according to one embodiment of the present application.

Embodiment 16 illustrates a structure block diagram of a processing device used in a second node according to one embodiment of the present application; as shown in FIG. 16. In FIG. 16, a processing device 1300 in a second node is comprised of a second transmitter 1301 and a second receiver 1302.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The second transmitter 1301 transmits a first signaling; and the second receiver 1302 receives a first signal and a second signal respectively in a first time-domain resource block and a second time-domain resource block.

In Embodiment 16, the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

In one embodiment, the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

In one embodiment, the first condition set comprises more than one condition, and the first condition is a condition in the first condition set; when there is one condition in the first condition set being satisfied, the first condition set is satisfied; the first condition set also comprises a second condition, the second condition being a condition in the first condition set; the second condition comprises that frequency-domain resources occupied by the first signal are different from frequency-domain resources occupied by the second signal.

In one embodiment, the first condition set comprises more than one condition, and the first condition is a condition in the first condition set; when there is one condition in the first condition set being satisfied, the first condition set is satisfied; the first condition set also comprises a third condition, the third condition being a condition in the first condition set; the third condition comprises that different reference signals are respectively used to determine a spatial relation of the first signal and a spatial relation of the second signal.

In one embodiment, the second receiver 1302 receives a first demodulation reference signal and a second demodulation reference signal respectively in the first time-domain resource block and the second time-domain resource block; herein, when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal.

In one embodiment, time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

In one embodiment, when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any change or modification made based on the embodiments described in this specification, if, through which similar partial or all technical effects can be obtained, shall be considered apparent and fall within the scope of protection of the present invention.

What is claimed is:

1. A first node for wireless communications, characterized in comprising:

a first receiver, receiving a first signaling; and a first transmitter, transmitting a first signal and a second signal respectively in a first time-domain resource block and a second time-domain resource block;

wherein the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

2. The first node according to claim 1, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

3. The first node according to claim 1, characterized in that the first condition set comprises more than one condition, and the first condition is a condition in the first condition set; when there exists one condition being satisfied in the first condition set, the first condition set is satisfied; the first condition set also comprises a second condition, the second condition being a condition in the first condition set; the second condition comprises that frequency-domain resources occupied by the first signal are different from frequency-domain resources occupied by the second signal;

or, the first condition set comprises more than one condition, and the first condition is a condition in the first condition set; when there exists one condition being satisfied in the first condition set, the first condition set is satisfied; the first condition set also comprises a third condition, the third condition being a condition in the first condition set; the third condition comprises that different reference signals are respectively used to determine a spatial relation of the first signal and a spatial relation of the second signal.

4. The first node according to claim 1, characterized in that the first transmitter also transmits a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal;

or, the first transmitter also transmits a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal; time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

5. The first node according to claim 1, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

6. A second node for wireless communications, characterized in comprising:

a second transmitter, transmitting a first signaling; and a second receiver, receiving a first signal and a second signal respectively in a first time-domain resource block and a second time-domain resource block;

wherein the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

7. The second node according to claim 6, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

8. The second node according to claim 6, characterized in that the first condition set comprises more than one condition, and the first condition is a condition in the first condition set; when there exists one condition being satisfied in the first condition set, the first condition set is satisfied; the first condition set also comprises a second condition, the second condition being a condition in the first condition set; the second condition comprises that frequency-domain resources occupied by the first signal are different from frequency-domain resources occupied by the second signal; or, the first condition set comprises more than one condition, and the first condition is a condition in the first condition set; when there exists one condition being satisfied in the first condition set, the first condition set is satisfied; the first condition set also comprises a third condition, the third condition being a condition in the first condition set; the third condition comprises that different reference signals are respectively used to determine a spatial relation of the first signal and a spatial relation of the second signal.

9. The second node according to claim 6, characterized in that the second receiver also receives a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal;

or, the second receiver also receives a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal; time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

10. The second node according to claim 6, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

11. A method in a first node for wireless communications, characterized in comprising:

receiving a first signaling; and transmitting a first signal and a second signal respectively in a first time-domain resource block and a second time-domain resource block;

wherein the first signaling is used for indicating the first time-domain resource block and the second time-domain resource block, the first time-domain resource block and the second time-domain resource block being orthogonal, and the first time-domain resource block and the second time-domain resource block both belonging to a reference time window; the first node maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the first node transmits a third signal in a third time-domain resource block and the third time-domain resource block is overlapped with only one of the first time-domain resource block or the second time-domain resource block.

12. The method according to claim 11, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

13. The method according to claim 11, characterized in that the first condition set comprises more than one condition, and the first condition is a condition in the first condition set; when there exists one condition being satisfied in the first condition set, the first condition set is satisfied; the first condition set also comprises a second condition, the second condition being a condition in the first condition set; the second condition comprises that frequency-domain resources occupied by the first signal are different from frequency-domain resources occupied by the second signal; or, the first condition set comprises more than one condition, and the first condition is a condition in the first condition set; when there exists one condition being satisfied in the first condition set, the first condition set is satisfied; the first condition set also comprises a third condition, the third condition being a condition in the first condition set; the third condition comprises that different reference signals are respectively used to determine a spatial relation of the first signal and a spatial relation of the second signal.

14. The method according to claim 11, characterized in comprising: transmitting a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal;

or, comprising: transmitting a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal; time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

15. The method according to claim 11, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

16. A method in a second node for wireless communications, characterized in comprising:

transmitting a first signaling; and receiving a first signal and a second signal respectively in a first time-domain resource block and a second time-domain resource block;

wherein the first signaling is used for indicating the first time-domain resource block and the second time-domain resource block, the first time-domain resource block and the second time-domain resource block being orthogonal, and the first time-domain resource block and the second time-domain resource block both belonging to a reference time window; a transmitter of the first signal and the second signal maintains power consistency and phase continuity between multiple first-type signals that belong to a same first-type time window in time domain; each of the first signal and the second signal is a first-type signal; whether a first condition set is satisfied is used to determine a number of first-type time window(s) comprised by the reference time window; when the first condition set is satisfied, the reference time window comprises more than one first-type time window; when the first condition set is not satisfied, the reference time window comprises one first-type time window; the first condition set comprises a first condition, the first condition comprising that the transmitter of the first signal and the second signal transmits a third signal in a third time-domain resource block and the third time-domain resource block is overlapped with only one of the first time-domain resource block or the second time-domain resource block.

17. The method according to claim 16, characterized in that the first condition also comprises that each of a spatial relation of the third signal and a spatial relation of a target signal is determined by a reference signal in a same reference signal set of Q reference signal sets; when the first time-domain resource block is overlapped with the third time-domain resource block, the target signal is the first signal; when the second time-domain resource block is overlapped with the third time-domain resource block, the target signal is the second signal; Q is a positive integer greater than 1.

18. The method according to claim 16, characterized in that the first condition set comprises more than one condition, and the first condition is a condition in the first condition set; when there exists one condition being satisfied in the first condition set, the first condition set is satisfied; the first condition set also comprises a second condition, the second condition being a condition in the first condition set; the second condition comprises that frequency-domain resources occupied by the first signal are different from frequency-domain resources occupied by the second signal;

or, the first condition set comprises more than one condition, and the first condition is a condition in the first condition set; when there exists one condition being satisfied in the first condition set, the first condition set is satisfied;

the first condition set also comprises a third condition, the third condition being a condition in the first condition set;

the third condition comprises that different reference signals are respectively used to determine a spatial relation of the first signal and a spatial relation of the second signal.

19. The method according to claim 16, characterized in comprising: receiving a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal;

or, comprising: receiving a first demodulation reference signal and a second demodulation reference signal respectively in the first time-domain resource block and the second time-domain resource block; wherein when the first time-domain resource block and the second time-domain resource block belong to a same first-type time window, a same demodulation reference signal is used for demodulating the first signal and the second signal, the same demodulation reference signal including the first demodulation reference signal and the second demodulation reference signal; when the first time-domain resource block and the second time-domain resource block respectively belong to different first-type time windows, the first demodulation reference signal and the second demodulation reference signal are respectively used for demodulating the first signal and the second signal; time-frequency resources occupied by the first demodulation reference signal and time-frequency resources occupied by the second demodulation reference signal are related to whether the first time-domain resource block and the second time-domain resource block belong to a same first-type time window; when the first time-domain resource block and the second time-domain resource block belong to a same first-type time window, the time-frequency resources occupied by the first demodulation reference signal and the time-frequency resources occupied by the second demodulation reference signal are both determined by a first demodulation reference signal pattern; when the first time-domain resource block and the second time-domain resource block respectively belong to different first-type time windows, the time-frequency resources occupied by the first demodulation reference signal and the time-frequency resources occupied by the second demodulation reference signal are both determined by a second demodulation reference signal pattern; the first demodulation reference signal pattern is different from the second demodulation reference signal pattern.

20. The method according to claim 16, characterized in that when the first condition set is satisfied, the reference time window comprises a first time window and a second time window, the first time window and the second time window being two orthogonal first-type time windows, and the first time-domain resource block and the second time-domain resource block are used to determine the first time window and the second time window, the first time-domain resource block belonging to the first time window, and the second time-domain resource block belonging to the second time window.

\*    \*    \*    \*    \*